(12) United States Patent
Shih et al.

(10) Patent No.: US 7,903,185 B2
(45) Date of Patent: Mar. 8, 2011

(54) PIXEL STRUCTURE AND EXPOSURE METHOD THEREOF

(75) Inventors: Po-Sheng Shih, Taoyuan Hsien (TW); Seok-Lyul Lee, Taoyuan Hsien (TW)

(73) Assignee: Hannstar Display Corporation, Tao-Yuan Hsien (TW)

( * ) Notice: Subject to any disclaimer, the term of this patent is extended or adjusted under 35 U.S.C. 154(b) by 180 days.

(21) Appl. No.: 11/778,855

(22) Filed: Jul. 17, 2007

(65) Prior Publication Data
US 2008/0013006 A1    Jan. 17, 2008

Related U.S. Application Data

(62) Division of application No. 10/901,982, filed on Jul. 30, 2004, now abandoned.

(30) Foreign Application Priority Data

Jan. 6, 2004  (TW) ............................... 93100282 A

(51) Int. Cl.
*G02F 1/1343*  (2006.01)
*G02F 1/136*  (2006.01)
*G02F 1/13*  (2006.01)

(52) U.S. Cl. ............................... 349/39; 349/187; 349/48
(58) Field of Classification Search ................... 349/48, 349/39
See application file for complete search history.

(56) References Cited

U.S. PATENT DOCUMENTS

| 5,132,819 | A | 7/1992 | Noriyama et al. |
| 5,173,792 | A | 12/1992 | Matsueda |
| 6,452,654 | B2 * | 9/2002 | Kubo et al. ................ 349/114 |
| 6,710,372 | B2 * | 3/2004 | Kim ............................ 257/72 |
| 2001/0045995 | A1 | 11/2001 | Numano et al. |
| 2002/0008826 | A1 | 1/2002 | Kim et al. |
| 2003/0112383 | A1 | 6/2003 | Kim |
| 2004/0004685 | A1 * | 1/2004 | Luo ............................ 349/113 |

* cited by examiner

*Primary Examiner* — W. Patty Chen
(74) *Attorney, Agent, or Firm* — Thomas, Kayden, Horstemeyer & Risley, LLP

(57) ABSTRACT

The present invention provides a pixel structure and exposure method thereof. This present invention divides these devices that influence the optical characteristic of the pixel region into two parts. Each part is located in a sub-pixel region of the pixel region. Different photolithography process rounds are performed in the different sub-pixel regions.

17 Claims, 16 Drawing Sheets

PIXEL STRUCTURE AND EXPOSURE METHOD THEREOF

CROSS-REFERENCE TO RELATED APPLICATION

This application is a divisional of U.S. Provisional Patent Application entitled, "Pixel Structure and Exposure Method Thereof," having Ser. No. 10/901,982, filed on Jul. 30, 2004, which is incorporated herein by reference in its entirety.

FIELD OF THE INVENTION

The present invention relates to a liquid crystal display (LCD) structure, and more particularly to a pixel structure of a liquid crystal display.

BACKGROUND OF THE INVENTION

Liquid crystal displays (LCD) have been widely applied in electrical products, such as digital watches, calculator, etc. for a long time. Moreover, with the advance of techniques for manufacture and design, thin film transistor-liquid crystal display (TFT-LCD) has been introduced into portable computers, personal digital assistants, and color televisions, as well as gradually replacing the CRT used for conventional display. The demands for TFT-LCD tend to be large in scale.

The typical size of a mask used in the photolithography process is much less than the size of the panel of a liquid crystal display. Therefore, a same photolithography process step has to apply to different regions in the panel. However, even though the process parameter value about machine can be controlled in the same situation, it is impossible to control the process parameter value about environment to keep the same. In other words, a same photolithography process applied to different regions in a panel can have different parameter values. Therefore, a shot mura defect is often generated between any two adjacent masks.

Accordingly, the structure of the conventional thin film transistor is illustrated in FIG. 1A, in which a gate electrode 204 and the storage capacitor electrode 206 are formed on a glass substrate 200. An insulating layer 208 is formed on the substrate 200 to cover the gate electrode 204 and the storage capacitor electrode 206. An amorphous silicon (a-silicon) layer 210 is formed above the insulating layer 208 and the gate electrode 204, and an n+ amorphous silicon layer 212 is deposited on the top surface of the a-silicon layer 210. In additional, a source/drain electrode structure 214 is formed above the n+ a-silicon layer 212. The data lines structure 216 is defined over the insulating layer 208, too, when forming the source/drain electrode structure 214. Moreover, a passivation layer 218 is formed on the top surface of glass substrate 200 to cover the a-silicon layer 210, the source/drain electrode structure 214 and the data lines structure 216. A contact hole 220 is formed on the passivation layer 218 to expose the top surface of the source/drain electrode structure 214. Then, an ITO layer 222 is formed on the passivation layer 218 to connect the source/drain electrode structure 214.

The diffusion capacitor ($C_{gs}$) is the capacitor between the gate and source/drain electrodes. The storage capacitor ($C_{ST}$) is the capacitor between the ITO layer 222 and the storage capacitor electrode 206. The capacitor ($C_{LC}$) is the pixel capacitor. FIG. 1B shows a waveform diagram for driving the thin film transistor LCD. The pixel capacitor $C_{LC}$ and the storage capacitor ($C_{ST}$) are charged to the voltage value, $V_P$, when the scan line scans the thin film transistor at a given time $T_1$. The thin film transistor is turned off at the non-selective time $T_2$. The pixel capacitor is maintained by the maintenance capacitor. However, the instant the thin film transistor is turned off, the voltage value ($V_P$) may fall by $\Delta V$. The $\Delta V$ is related to the diffusion capacitor ($C_{gs}$) between the gate and source electrodes, pixel capacitor ($C_{LC}$) and the storage capacitor ($C_{ST}$). The $\Delta V$ value is shown as follows:

$$\Delta V = (V_{gh} - V_{gL}) \times C_{gs} / (C_{gs} + C_{LC} + C_{ST}) \quad (1)$$

The $V_{gh}$ is the high voltage providing to the gate electrode. The $V_{gL}$ is the low voltage providing to the gate electrode. The gate electrode 204, the storage capacitor electrode 206, the ITO layer 222 and the a-silicon layer 210 are respectively formed by using different photolithography processes. Therefore, when a large scale LCD panel is divided into several regions for respectively performing photolithography process, an abrupt image difference is generated if the process parameters between regions are different. For example, the $\Delta V$ value is different if a misalignment exists between regions.

Referring to FIG. 2, it illustrates a schematic diagram of an in-plane switching (IPS) mode liquid crystal display. In general, IPS technology enlarges the viewing angle of a liquid crystal display. The liquid crystal molecule in a typical liquid crystal display is rotated up or rotated down to display an image. However, the liquid crystal molecule in the IPS mode liquid crystal display is rotated in a plane to display an image. According to the IPS mode liquid crystal display, two electrodes 204 are formed in a glass substrate 200 to drive the liquid crystal molecule 206. Therefore, the rotation angle of liquid crystal molecule in the IPS mode liquid crystal display will be affected once the photolithography process performed in adjacent region changes the distance between electrodes. The different rotation angles will affect the display quality of liquid crystal display.

The typical solution method is to form a tooth-type exposure appearance or to form a mosaic-type exposure appearance in the adjacent region between the masks. However, the two methods require exact alignment; otherwise, the display an image will be affected.

SUMMARY OF THE INVENTION

Therefore, the main purpose of the present invention is to provide a pixel structure of a liquid crystal display to reduce the effect of exposure performed in different regions in a panel.

Another object of the present invention is to provide a pixel structure of a liquid crystal display to reduce the misalignment effect because of exposure performed in different regions in a panel.

Yet another object of the present invention is to provide an exposure method to apply to the pixel structure of the present invention. The pixel region can present an average optical characteristic presented by its adjacent pixel region when this pixel region is divided into several regions respectively formed by different photolithography process round.

Yet another object of the present invention is to provide an exposure method to apply to the pixel structure of the present invention. According to this method, display quality is not reduced in the pixel region divided into several regions respectively formed by different photolithography process rounds because a buffer region is built into this pixel region.

According to the pixel structure and exposure method thereof in the present invention, those devices that may affect the optical characteristic of a pixel region, such as switch transistors or storage capacitors, are divided into two groups. The same photolithography process is respectively applied to the two groups. Therefore, in a pixel region, the same devices are formed by different photolithography process rounds. The pixel region presents an average optical characteristic of these devices. Therefore, the pixel regions located in the region that links two regions formed by different photolithography process rounds can present an average optical characteristic of their adjacent pixel regions. In other words, the method and structure of the present invention can improve the abrupt image change situation by building a buffer region into this pixel region.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
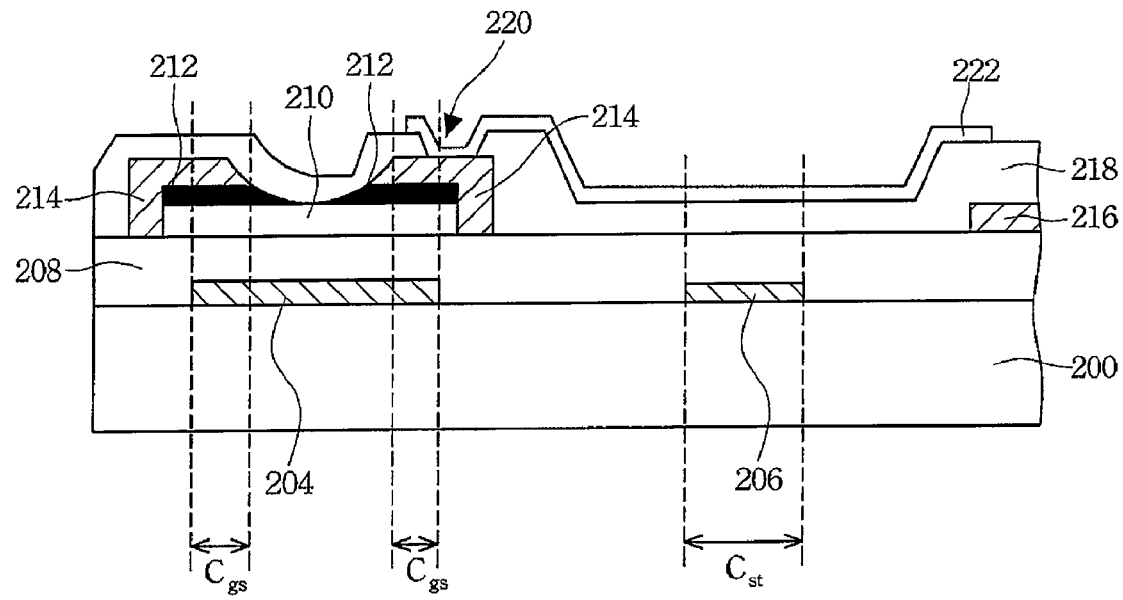
FIG. 1A illustrates a schematic diagram of a typical thin film transistor in a liquid crystal display.
Figure 1B:
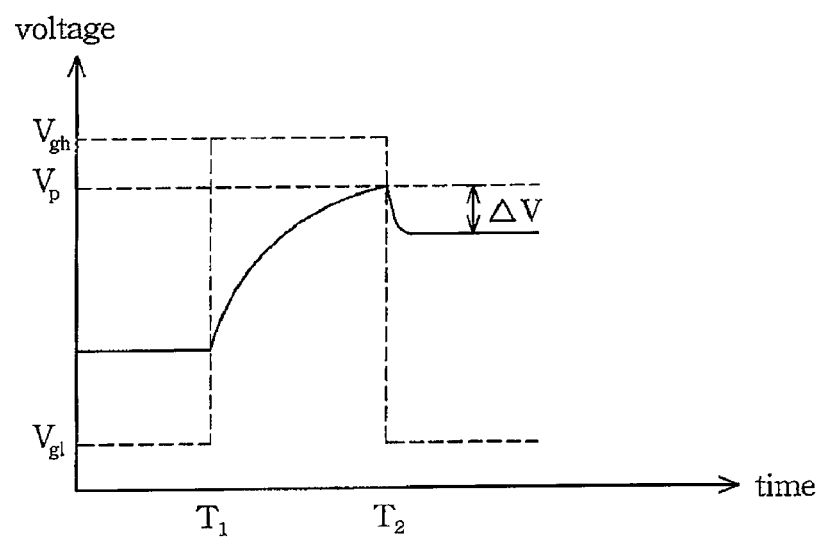
FIG. 1B illustrate a waveform diagram for driving the thin film transistor liquid crystal display according to the prior art.
Figure 2:
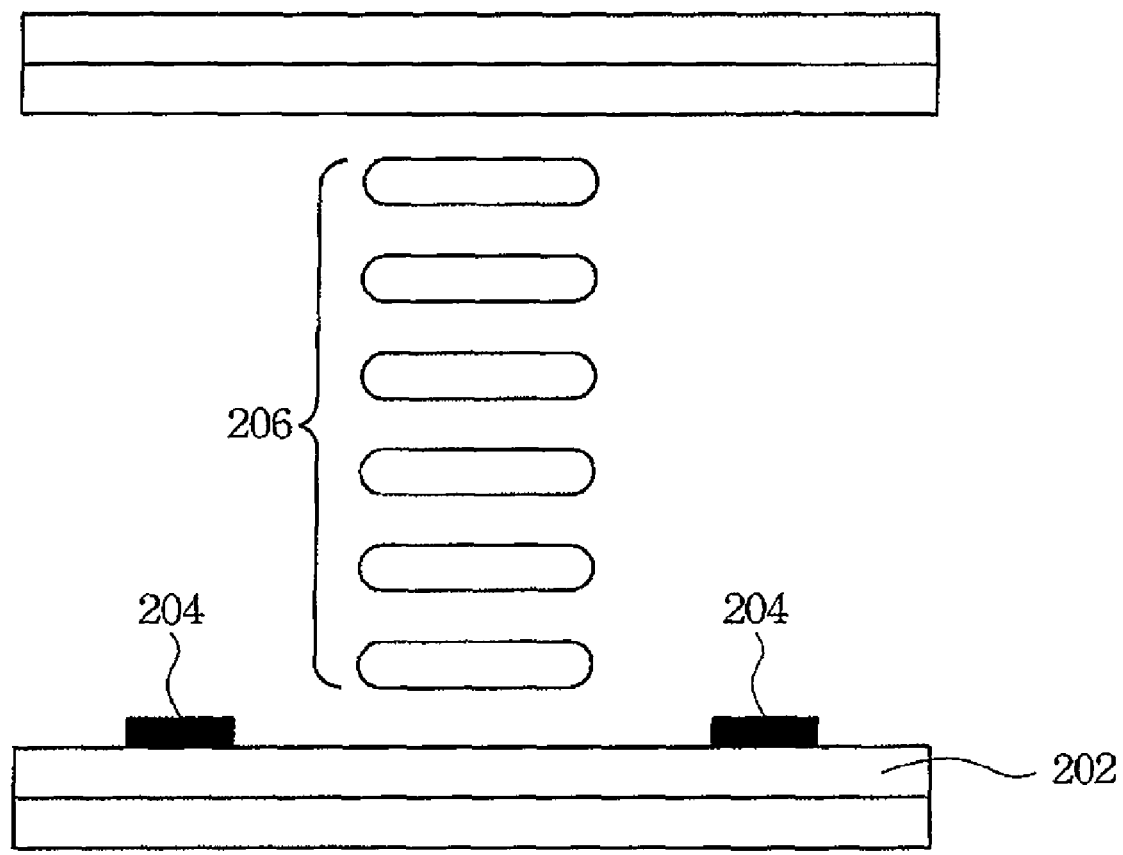
FIG. 2 illustrates a schematic diagram of a in-plan switching mode liquid crystal display according to the prior art.

Without limiting the spirit and scope of the present invention, the pixel structure and the exposure method thereof proposed in the present invention are illustrated with six preferred embodiments. One of ordinary skill in the art, upon acknowledging the embodiment, can apply the pixel structure and the exposure method of the present invention to various liquid crystal displays. Accordingly, the typical size of a mask used in a photolithography process is much less than the size of the panel of a liquid crystal display. Therefore, a same photolithography process step has to be performed repeatedly in different regions in a panel. Therefore, a shot mura defect is often generated in the region that link two masks for performing different photolithography process rounds. Therefore, the present invention provides a pixel structure and a sub-pixel exposure method to compensate for the optical characteristic of the region linking two masks of different photolithography process rounds. This method and structure can step-by-step change the optical characteristic. Therefore, an abrupt image change does not happen in the present invention. The present invention can be understood by the following detailed embodiments. However, these embodiments do not limit the scope of the present invention.

The present invention provides different pixel structures to resolve the typical problem of ΔV value difference in a panel. This ΔV value difference results because different photolithography process rounds are respectively applied to different regions in a pixel region. The different photolithography process rounds generate different process parameters. The different process parameters cause different optical characteristic to generate an abrupt image change in a panel, especially in the region linking two regions formed in different photolithography process rounds. Therefore, the present invention provides a pixel structure and exposure method to release the optical characteristic change in the region for linking two regions through different photolithography process rounds.

First Embodiment

The first embodiment of the present invention is to form several switching transistors in a pixel region. On the other hand, the linking region of two masks of photolithography process rounds is aligned to between switching transistors. Therefore, the photolithography process for forming each switching transistor is respectively performed. In other words, the switching transistors located in the two sides of the linking region are formed by different photolithography process rounds. The different photolithography process rounds can make the switching transistors have different process parameters. The pixel region is controlled by the two switching transistors. Therefore, the pixel region's optical characteristic is also affected by the two switching transistors. In other words, the optical characteristic of the linking region is determined by the switching transistors located in the two sides of the linking region. The optical characteristic difference in the linking region can be released by compensation provided by the process parameters for the switching transistors.

Figure 3A:
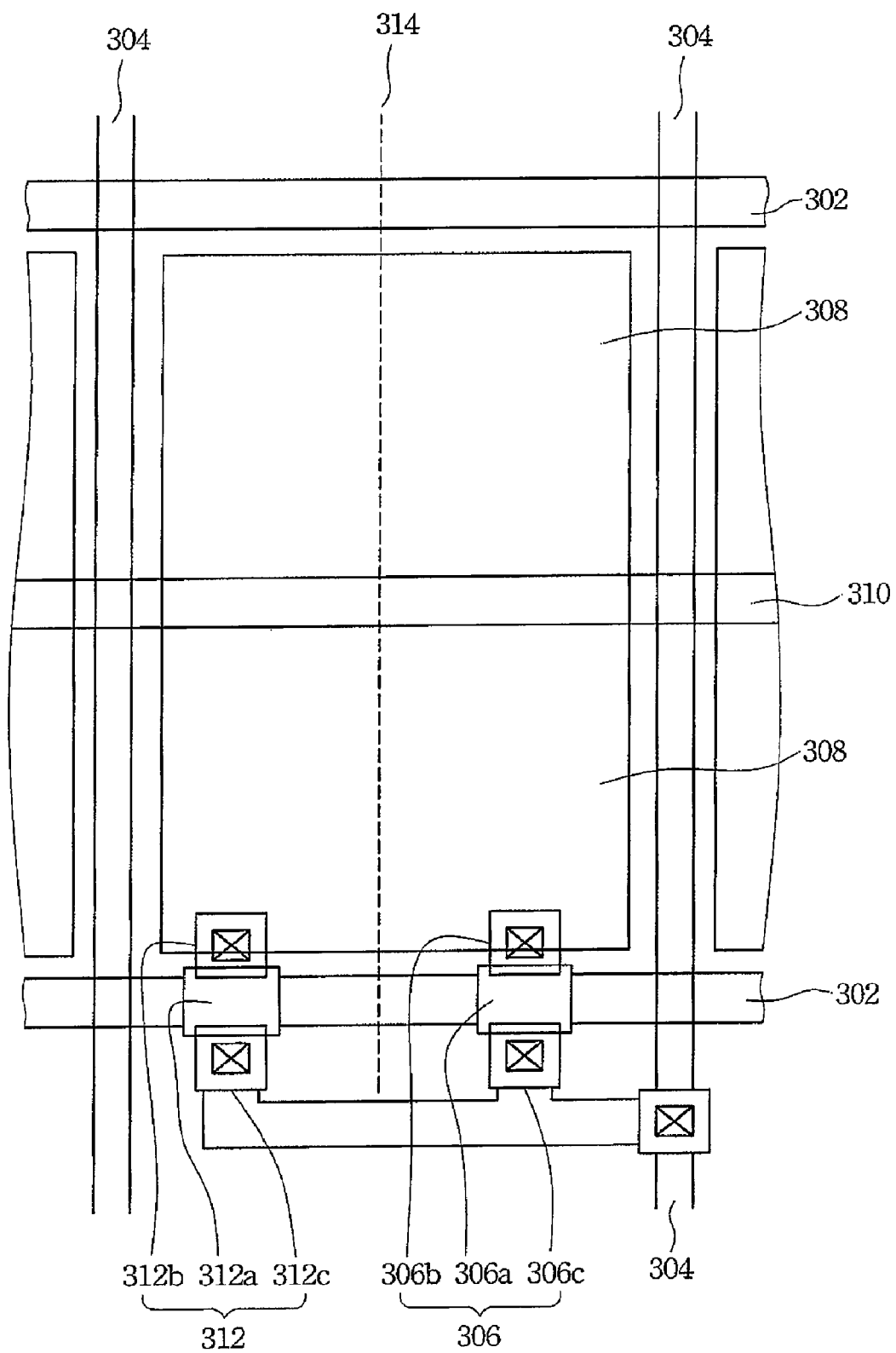
FIG. 3A illustrates a schematic top view diagram of a pixel region of a liquid crystal display in accordance with the first embodiment of the present invention.

FIG. 3A illustrates a schematic top view diagram of a pixel region of a liquid crystal display in accordance with the first embodiment of the present invention. A gate electrode 306a of the switching transistor 306 is connected with a scan line 302. A drain electrode 306b of the switching transistor 306 is connected with a pixel electrode 308. A source electrode 306c of the switching transistor 306 is connected with a video data line 304. On the other hand, a gate electrode 312a of the switching transistor 312 is connected with a scan line 302. A drain electrode 312b of the switching transistor 312 is connected with a pixel electrode 308. A source electrode 312c of the switching transistor 312 is connected with a video data line 304. A common electrode line 310 is used to provide the pixel electrode 308 as a common electrode in this embodiment. The switching transistor 306 and the switching transistor 312 formed on a glass substrate both have a thin film transistor structure. The pixel electrode is formed by ITO or IZO thin film.

When manufacturing the pixel region of the first embodiment, the linking region of two masks of photolithography process rounds are aligned to between the two switching transistors as indicated by the arrow 314 in the figure. Therefore, in this embodiment, the two switching transistor are formed by different photolithography process rounds. In other words, the switching transistor 306 and the switching transistor 312 are formed by different photolithography process rounds. For example, the switching transistor 312 is arranged in the first region and is formed by the first photolithography process round. The switching transistor 306 is arranged in the second region and is formed by the second photolithography process round. It is noted that the arrangement method of the switching transistors can be changed according the requirement of the user. The switching transistor 306 and the switching transistor 312 are formed by the different photolithography process rounds; therefore, some differences in process parameters exist between the two switching transistors. The different process parameters may influence the diffusion capacitor Cgs between the source/drain electrode and the gate electrode of the two switching transistors. In other words, according to this embodiment, there are two switching transistors with different process parameters in a pixel region. Both switching transistors can influence the optical characteristic of this pixel region.

Figure 3B:
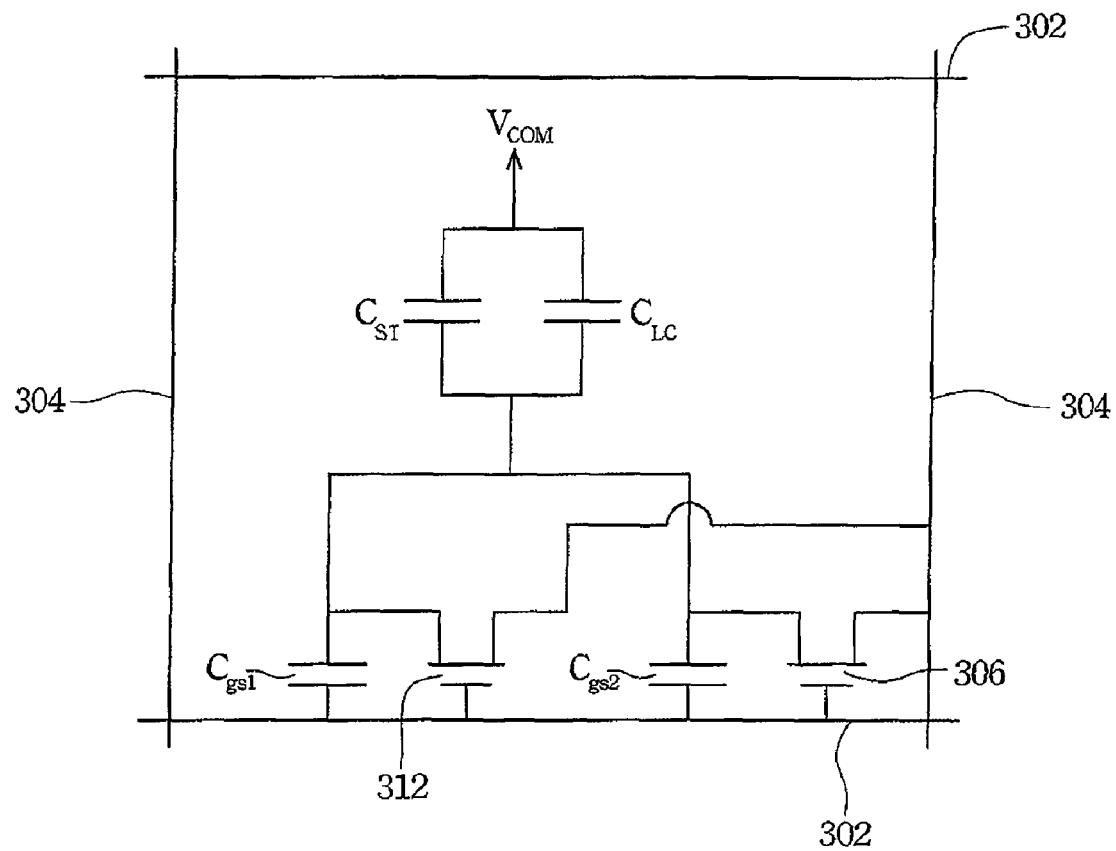
FIG. 3B illustrates a schematic diagram of an equivalent circuit of a pixel region of a liquid crystal display in accordance with the first embodiment of the present invention.

FIG. 3B illustrates a schematic diagram of an equivalent circuit of a pixel region of a liquid crystal display in accordance with the first embodiment of the present invention. There are two switching transistors 306 and 312 in this pixel region to control the video signal transmission. A pixel capacitor $C_{LC}$ and a storage capacitor $C_{ST}$ are driven by the two switching transistors 306 and 312. The switching transistors 306 and 312 are formed in a transparent substrate (such as a glass). According to this embodiment, there are two switching transistors are formed by different photolithography process rounds in a pixel region. Therefore, the switching transistors 306 and 312 will have different diffusion capacitors between source/drain electrode and gate electrode. The switching transistor 312 has the diffusion capacitor $C_{gs1}$ and the switching transistor 306 has the diffusion capacitor $C_{gs2}$.

The source and drain electrodes of the switching transistor 312 are respectively connected with the pixel capacitor $C_{LC}$ and the storage capacitor $C_{ST}$. On the other hand, the source and drain electrodes of the switching transistor 306 are respectively connected with the pixel capacitor $C_{LC}$ and the storage capacitor $C_{ST}$. When the video data line 304 is selected, the source/drain electrodes of the switching transistors 306 and 312 can receive data from the video data line 304.

When the scan signal selects the scan line 302, the switching transistors 306 and 312 are turned on. At this time, the video data transmitted by the video data line 304 can charge the pixel capacitor $C_{LC}$ and the storage capacitor $C_{ST}$ through the switching transistors 306 and 312. After the scan signal is removed, the charge is still stored in the pixel capacitor $C_{LC}$ until the scan signal selects this scan line 302 again. The stored charge in the pixel capacitor $C_{LC}$ can form an image in the display.

Figure 3C:
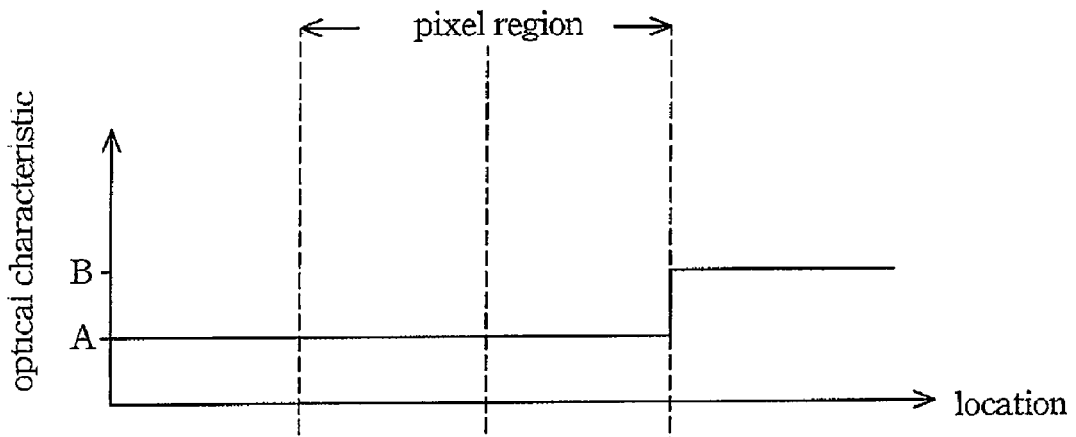
FIG. 3C to FIG. 3E illustrate the optical characteristic change schematic diagram of a pixel region of a liquid crystal display in accordance with the first embodiment of the present invention.
Figure 3D:
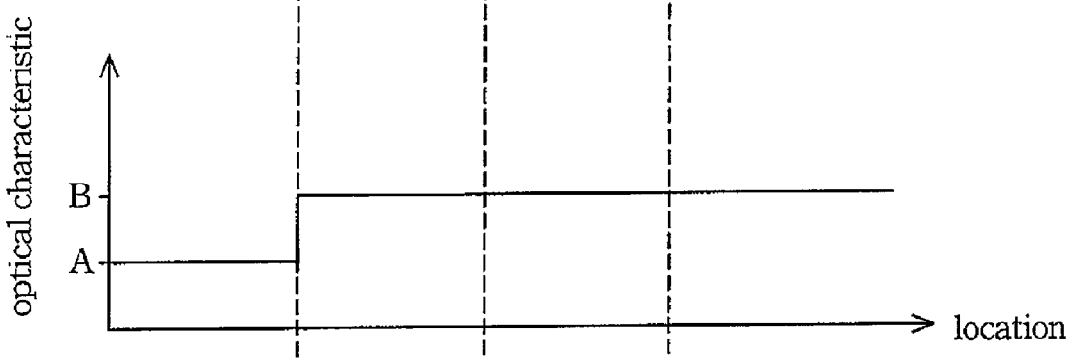
Figure 3E:
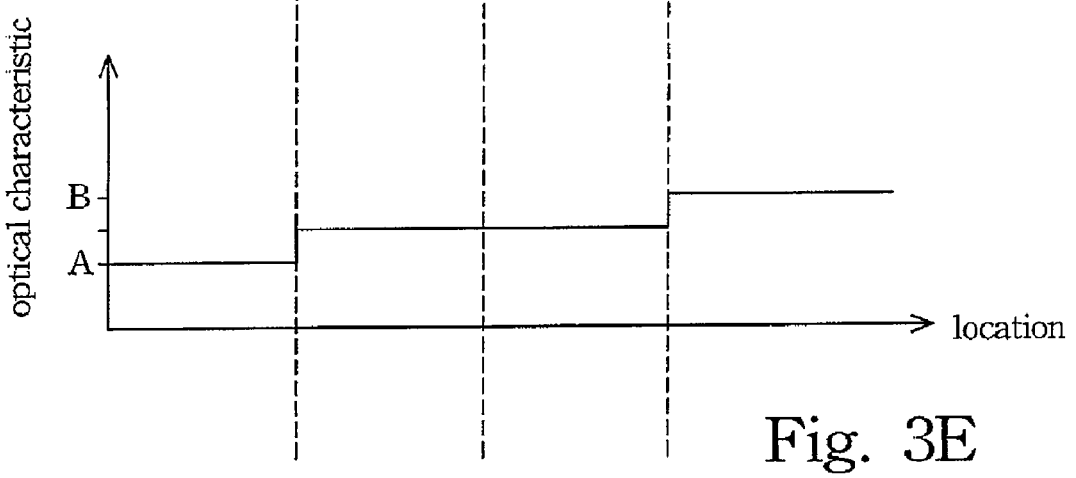

The two switching transistors in a pixel region can determine the optical characteristic of this pixel region together. FIGS. 3C to 3E illustrate the optical characteristic change schematic diagram of a pixel region of a liquid crystal display in accordance with the first embodiment of the present invention. Reference is also made to FIG. 3A; the dotted line in the FIG. 3A indicates the linking region of two masks of photolithography process rounds.

According to this embodiment, the switching transistor 312 is arranged in the first region and is formed by the first photolithography process round. The switching transistor 306 is arranged in the second region and is formed by the second photolithography process round. When the first photolithography process round is finished, the process parameters of the switching transistor 312 can be determined by the first photolithography process round. When the second photolithography process round is finished, the process parameters of the switching transistor 306 can be determined by the second photolithography process round. The optical characteristic in the linking region can be determined by the two switching transistors.

On the other hand, if the process parameter of the first photolithography process round presents an "A" optical characteristic and the process parameter of the second photolithography process round presents a "B" optical characteristic, the whole pixel region presents an "A" optical characteristic when the two switching transistors 306 and 312 are formed by the first photolithography process round as shown in the FIG. 3C. Similarly, the whole pixel region presents a "B" optical characteristic when the two switching transistors 306 and 312 are formed by the second photolithography process round, as shown in the FIG. 3D.

FIG. 3E illustrates the optical characteristic diagram of the pixel region when the two switching transistors 306 and 312 are formed by different photolithography process rounds. According to the first embodiment, the switching transistor 306 is formed by the first photolithography process round and the switching transistor 312 is formed by the second photolithography process round. Therefore, the optical characteristic of the whole pixel region is determined by the "A" optical characteristic and the "B" optical characteristic. The optical characteristic diagram is the combined diagram of the "A" optical characteristic and the "B" optical characteristic. In other words, the optical characteristic of the whole pixel region is the average value of the "A" optical characteristic and the "B" optical characteristic.

According to the first embodiment, two switching transistors are formed in a pixel region by different photolithography process rounds. At this time, the linking region of two masks of photolithography process rounds is aligned to this region between the two switching transistors. In other words, the switching transistors located on the two sides of the linking region are formed by different photolithography process rounds. Therefore, the pixel region's optical characteristic is affected by the two switching transistors and presents an average value of the optical characteristics of the two switching transistors. Compared with FIGS. 3C to 3E, the optical characteristic presented by the pixel region of the first embodiment has a smoother change.

Second Embodiment

The second embodiment of the present invention forms several storage capacitors in a pixel region. On the other hand, the linking region of two masks of photolithography process rounds is aligned to this region among the storage capacitors. Therefore, the photolithography process for forming each pixel capacitor is respectively performed. In other words, the pixel region of the second embodiment is also controlled by a switching transistor; however, the storage capacitors are formed by different photolithography process rounds. The different photolithography process rounds provide the storage capacitors with different process parameters. Therefore, the pixel region's optical characteristic is also affected by the storage capacitors. In other words, the optical characteristic of the linking region is determined by the storage capacitors located on the two sides of the linking region. The optical characteristic difference in the linking region can be released by the process parameters compensation of the storage capacitors.

Figure 4A:
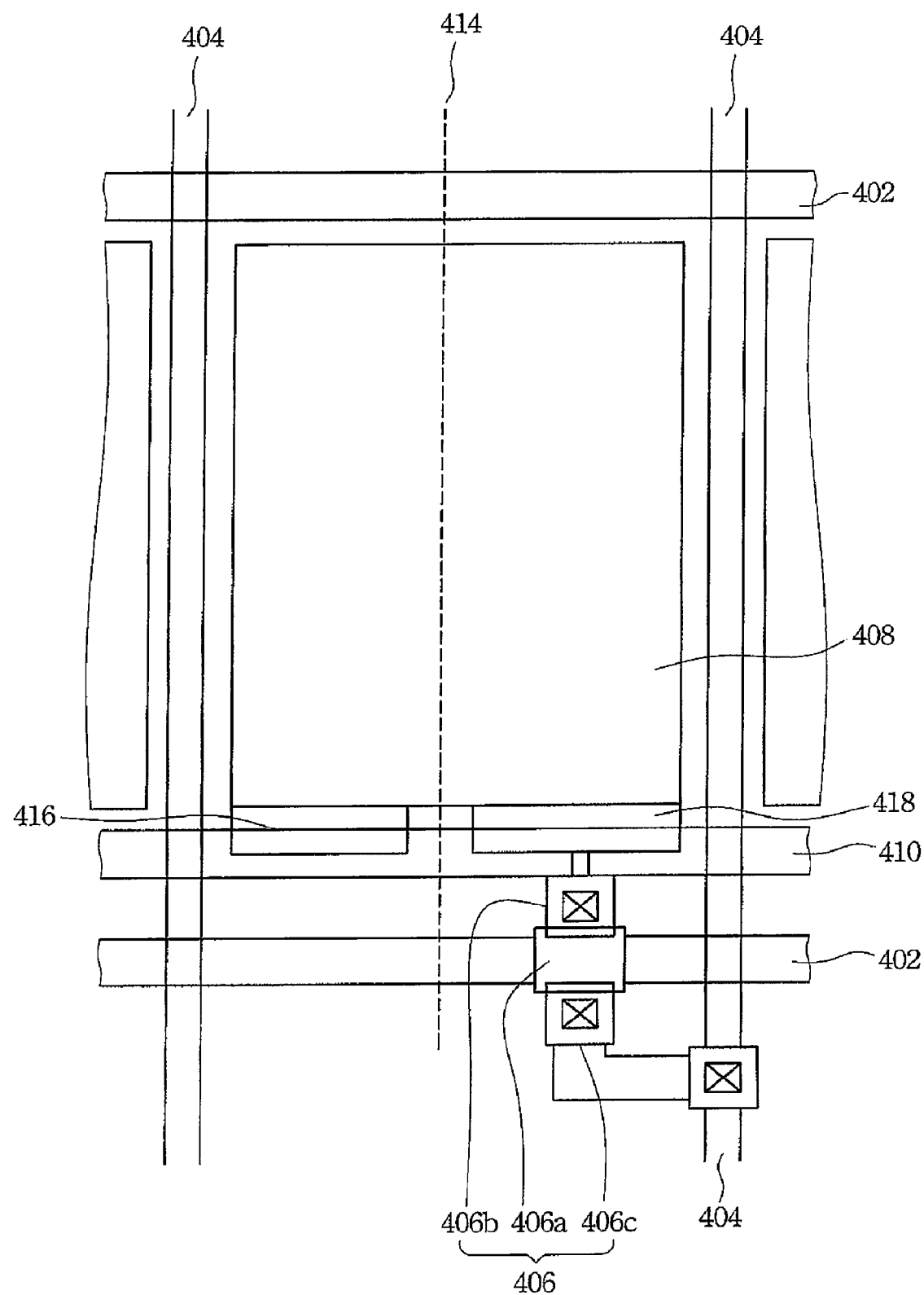
FIG. 4A illustrates a schematic top view diagram of a pixel region of a liquid crystal display in accordance with the second embodiment of the present invention.

FIG. 4A illustrates a schematic top view diagram of a pixel region of a liquid crystal display in accordance with the second embodiment of the present invention. A gate electrode 406a of the switching transistor 406 is connected with a scan line 402. A drain electrode 406b of the switching transistor 406 is connected with a pixel electrode 408. A source electrode 406c of the switching transistor 406 is connected with a video data line 404. The switching transistor 406 formed on a glass substrate has a structure of thin film transistor. The pixel electrode is formed by ITO or IZO thin film. Typically, storage capacitor $C_{ST}$ is the capacitor between the common electrode 410 and the pixel electrode 408. Therefore, according to the second embodiment, the overlapping region of the common electrode 410 and the pixel electrode 408 are divided into two parts. That is, that the storage capacitor in a pixel region is composed of two storage capacitors 416 and 418. The linking region of two masks of photolithography process rounds is aligned to this region among the storage capacitors. Therefore, the photolithography process for forming each pixel capacitor is respectively performed.

When manufacturing the pixel region of the second embodiment, the linking region of two masks of photolithography process rounds is aligned between the two storage capacitors as indicated by the arrow 414 in the figure. Therefore, in this embodiment, the two storage capacitors are formed by different photolithography process rounds. In other words, the storage capacitor 416 and the storage capacitor 418 are formed by different photolithography process rounds. For example, the storage capacitor 416 is arranged in the first region and is formed by the first photolithography process round. The storage capacitor 418 is arranged in the second region and is formed by the second photolithography process round. It is noted that the arrangement method of the storage capacitors can be changed according the requirements of the user. The storage capacitor 416 and the storage capacitor 418 are formed by different photolithography process rounds; therefore, some process parameters differences exist between the two storage capacitors. The different process parameters may influence storage capacitor $C_{ST}$. In other words, according to this embodiment, there are two storage capacitors with different process parameters in a pixel region. The two storage capacitors can both influence the optical characteristic of this pixel region.

Figure 4B:
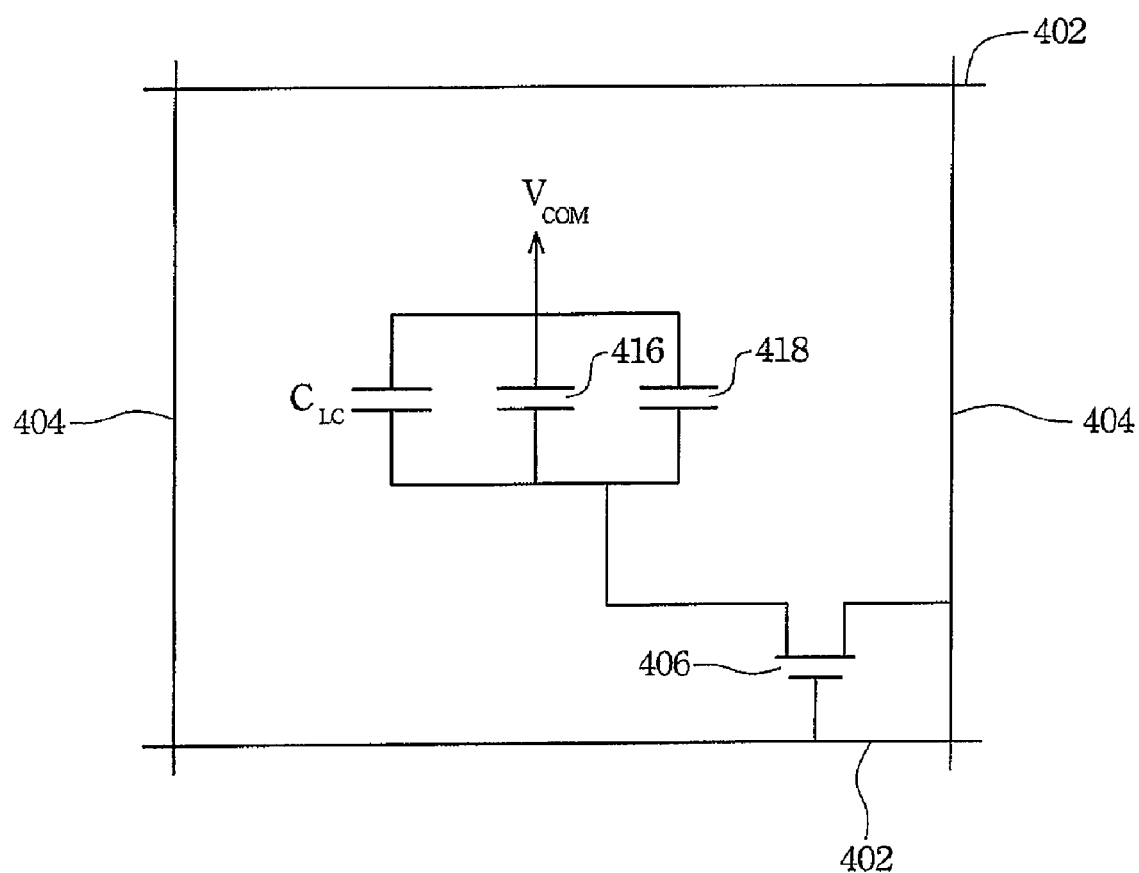
FIG. 4B illustrates a schematic diagram of an equivalent circuit of a pixel region of a liquid crystal display in accordance with the second embodiment of the present invention.

FIG. 4B illustrates a schematic diagram of an equivalent circuit of a pixel region of a liquid crystal display in accordance with the second embodiment of the present invention. A switching transistor 406 in this pixel region is used to control the video signal transmission. A pixel capacitor $C_{LC}$ and two storage capacitors 416 and 418 are driven by the switching transistor 406. The switching transistor 406 is formed in a transparent substrate (such as a glass). According to this embodiment, the common electrode and the pixel electrode are formed by different photolithography process rounds. The storage capacitor is formed between the common electrode and the pixel electrode. Therefore, different photolithography process rounds may form different storage capacitors.

The source and drain electrodes of the switching transistor 406 are respectively connected with the pixel capacitor $C_{LC}$ and the two storage capacitors 416 and 418. When the video data line 404 is selected, the source/drain electrodes of the switching transistor 406 can receive data from the video data line 404.

When the scan signal selects the scan line 402, the switching transistor 406 is turned on. At this time, the video data transmitted by the video data line 404 can charge the pixel capacitor $C_{LC}$ and the storage capacitors 416 and 418 through the switching transistor 406. After the scan signal is removed, the charge is still stored in the pixel capacitor $C_{LC}$ until the scan signal selects this scan line 402 again. The stored charge in the pixel capacitor $C_{LC}$ can form an image in the display.

Figure 4C:
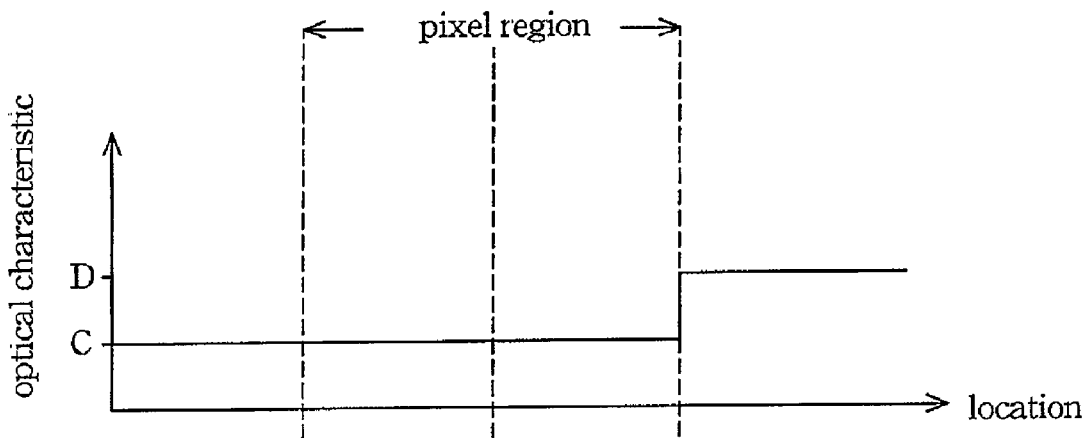
FIG. 4C to FIG. 4E illustrate the optical characteristic change schematic diagram of a pixel region of a liquid crystal display in accordance with the second embodiment of the present invention.
Figure 4D:
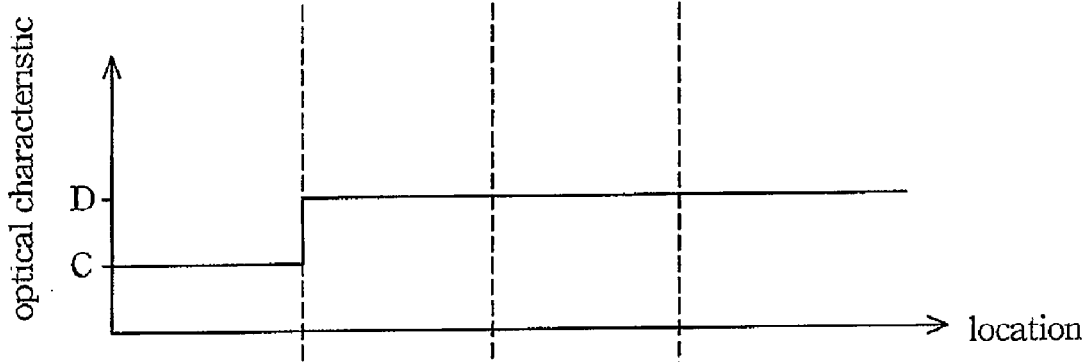
Figure 4E:
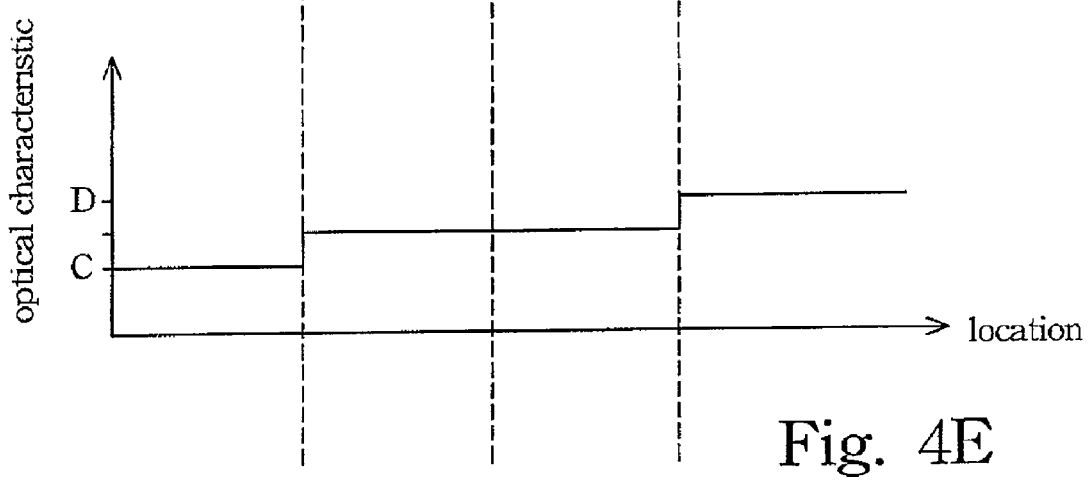

The two storage capacitors in a pixel region can determine the optical characteristic of this pixel region together. FIGS. 4C to 4E illustrate the optical characteristic change schematic diagram of a pixel region of a liquid crystal display in accordance with the second embodiment of the present invention. Reference is also made to FIG. 4A; the dotted line in FIG. 4A indicates the linking region of two masks of photolithography process rounds.

According to this embodiment, the switching transistor 416 is arranged in the first region and is formed by the first photolithography process round. The switching transistor 418 is arranged in the second region and is formed by the second photolithography process round. When the first photolithography process round is finished, the process parameters of the switching transistor 416 can be determined by the first photolithography process round. When the second photolithography process round is finished the process parameters of the switching transistor 418 can be determined by the second photolithography process round. The optical characteristic in the linking region can be determined by the two storage capacitors.

On the other hand, if the process parameter of the first photolithography process round presents a "C" optical characteristic and the process parameter of the second photolithography process round presents a "D" optical characteristic, the whole pixel region presents a "C" optical characteristic when the two storage capacitors 416 and 418 are formed by the first photolithography process round as shown in the FIG. 4C. Similarly, the whole pixel region presents a "D" optical characteristic when the two storage capacitors 416 and 418 are formed by the second photolithography process round, as shown in the FIG. 4D.

FIG. 4E illustrates the optical characteristic diagram of the pixel region when the two storage capacitors 416 and 418 are formed by different photolithography process round. According to the second embodiment, the storage capacitor 416 is formed by the first photolithography process round and the storage capacitor 418 is formed by the second photolithography process round. Therefore, the optical characteristic of the whole pixel region is determined by the "C" optical characteristic and the "D" optical characteristic. The optical characteristic diagram is the combined diagram of the "C" optical characteristic and the "D" optical characteristic. In other words, the optical characteristic of the whole pixel region is the average value of the "C" optical characteristic and the "D" optical characteristic.

According to the second embodiment, two storage capacitors are formed in a pixel region by different photolithography process rounds. At this time, the linking region of two masks of photolithography process rounds is aligned to this region between the two storage capacitors. In other words, the storage capacitors located in the two sides of the linking region are formed by different photolithography process rounds. Therefore, the pixel region's optical characteristic is affected by the two storage capacitors and presents an average value of the optical characteristics of the two storage capacitors. Compared with FIGS. 4C to 4E, the optical characteristic presented by the pixel region of the second embodiment has a smoother change.

Third Embodiment

The third embodiment of the present invention forms several storage capacitors in a pixel region. On the other hand, the linking region of two masks of photolithography process rounds is aligned to this region among the storage capacitors. Therefore, the photolithography process for forming each pixel capacitor is respectively performed. The main point of difference with the second embodiment is that the storage capacitor is composed of a scan electrode and the pixel electrode in the third embodiment. Similarly, the pixel region in the third embodiment is also controlled by a switching transistor. The overlapping region of the pixel electrode and the scan electrode is divided. Therefore, the storage capacitor includes two parts in a pixel region. The two parts are formed by different photolithography process rounds.

Figure 5A:
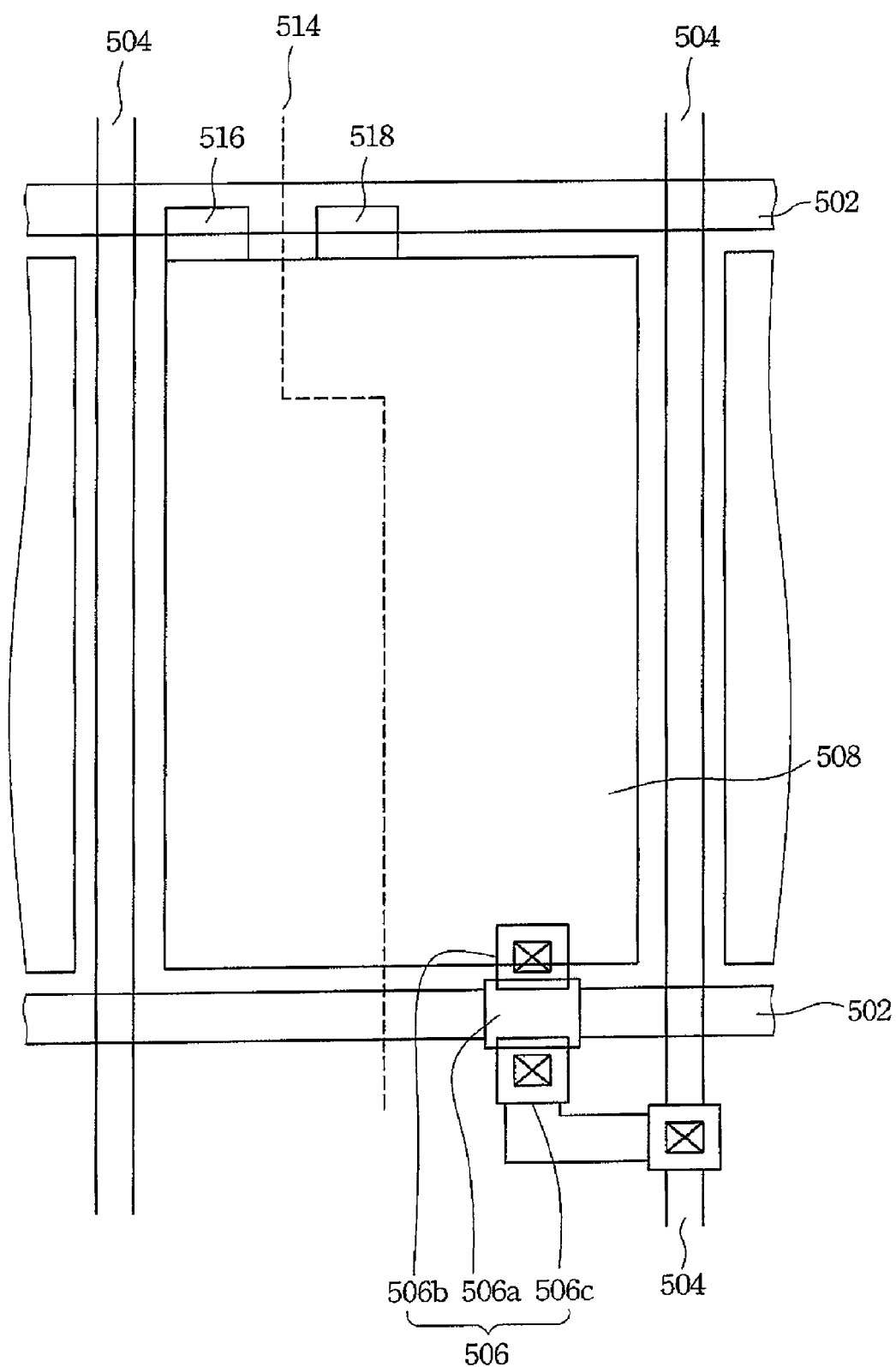
FIG. 5A illustrates a schematic top view diagram of a pixel region of a liquid crystal display in accordance with the third embodiment of the present invention.

FIG. 5A illustrates a schematic top view diagram of a pixel region of a liquid crystal display in accordance with the third embodiment of the present invention. A gate electrode 506a of the switching transistor 506 is connected with a scan line 502. A drain electrode 506b of the switching transistor 506 is connected with a pixel electrode 508. A source electrode 506c of the switching transistor 506 is connected with a video data line 504. The switching transistor 506 formed on a glass substrate has a structure of thin film transistor. The pixel electrode is formed by ITO or IZO thin film.

According to this embodiment, the storage capacitor $C_{ST}$ is the capacitor between the scan line 502 and the pixel electrode 508. Therefore, according to the third embodiment, the overlapping region of the scan line 502 and the pixel electrode 508 are divided into two parts. That is, that the storage capacitor in a pixel region is composed of two storage capacitors 516 and 518. The linking region 514 of two masks of photolithography process rounds is aligned to this region among the storage capacitors. Therefore, the photolithography process for forming each pixel capacitor is respectively performed.

When manufacturing the pixel region of the third embodiment, the linking region of two masks of photolithography process rounds is aligned between the two storage capacitors, as indicated by the arrow 514 in the figure. Therefore, in this embodiment, the two storage capacitors are formed by different photolithography process rounds. In other words, the storage capacitor 516 and the storage capacitor 518 are formed by different photolithography process rounds. For example, the storage capacitor 516 is arranged in the first region and is formed by the first photolithography process round. The storage capacitor 518 is arranged in the second region and is formed by the second photolithography process round. It is noted that the arrangement method of the storage capacitors can be changed according to the requirements of the user. The storage capacitor 516 and the storage capacitor 518 are formed by the different photolithography process rounds; therefore, some process parameters differences exist between the two storage capacitors. The different process parameters may influence storage capacitor. In other words, according to this embodiment, there are two storage capacitors with different process parameters in a pixel region. The two storage capacitors influence the optical characteristic of this pixel region.

Figure 5B:
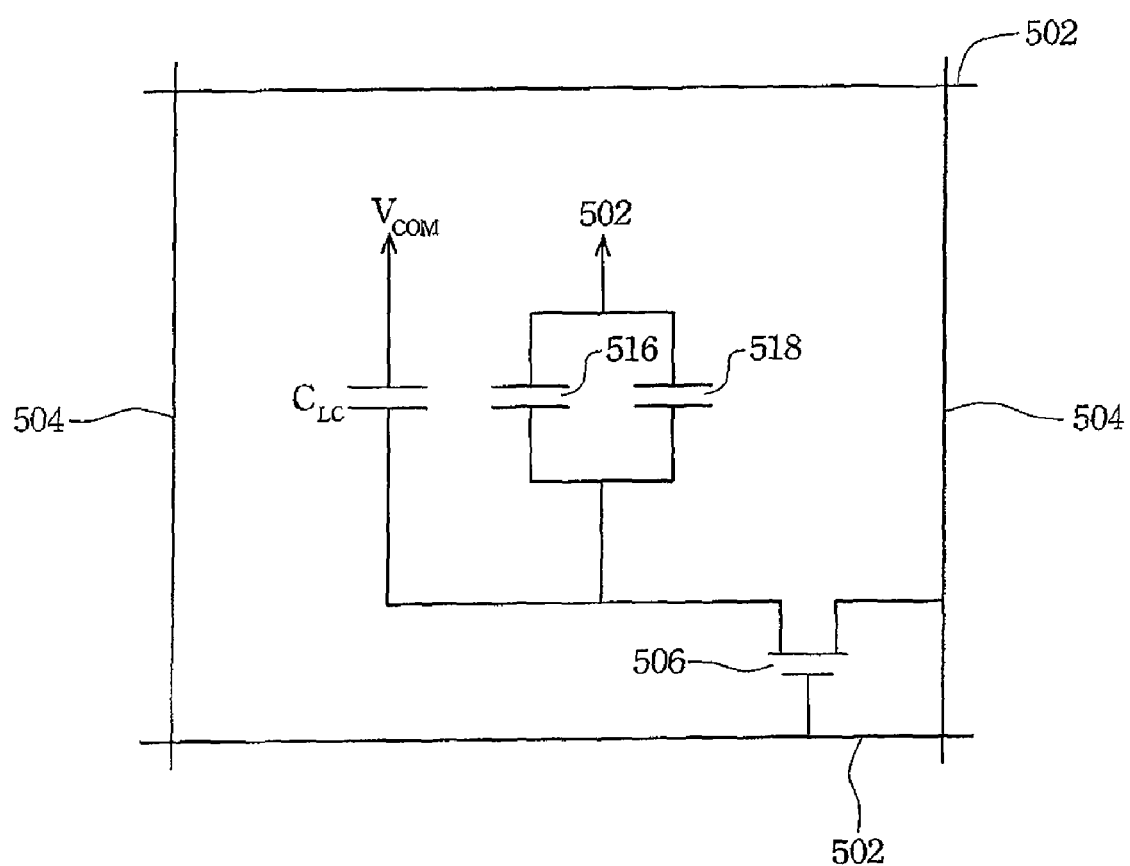
FIG. 5B illustrates a schematic diagram of an equivalent circuit of a pixel region of a liquid crystal display in accordance with the third embodiment of the present invention.

FIG. 5B illustrates a schematic diagram of an equivalent circuit of a pixel region of a liquid crystal display in accordance with the third embodiment of the present invention. A switching transistor 506 in this pixel region is used to control the video signal transmission. A pixel capacitor $C_{LC}$ and two storage capacitors 516 and 518 are driven by the switching transistor 506. The switching transistor 506 is formed in a transparent substrate (such as a glass). According to this embodiment, the common electrode and the pixel electrode are formed by different photolithography process rounds. The storage capacitor is formed between the common electrode and the pixel electrode. Therefore, different photolithography process rounds may form different storage capacitor.

The source and drain electrodes of the switching transistor 506 are respectively connected with the pixel capacitor $C_{LC}$ and the two storage capacitors 516 and 518. When the video data line 504 is selected, the source/drain electrodes of the switching transistor 506 can receive data from the video data line 504.

When the scan signal selects the scan line 502, the switching transistor 506 is turned on. At this time, the video data transmitted by the video data line 504 can charge the pixel capacitor $C_{LC}$ and the storage capacitors 516 and 518 through the switching transistor 506. After the scan signal is removed, the charge is still stored in the pixel capacitor $C_{LC}$ until the scan signal selects this scan line 502 again. The stored charge in the pixel capacitor $C_{LC}$ can form an image in the display.

Figure 5C:
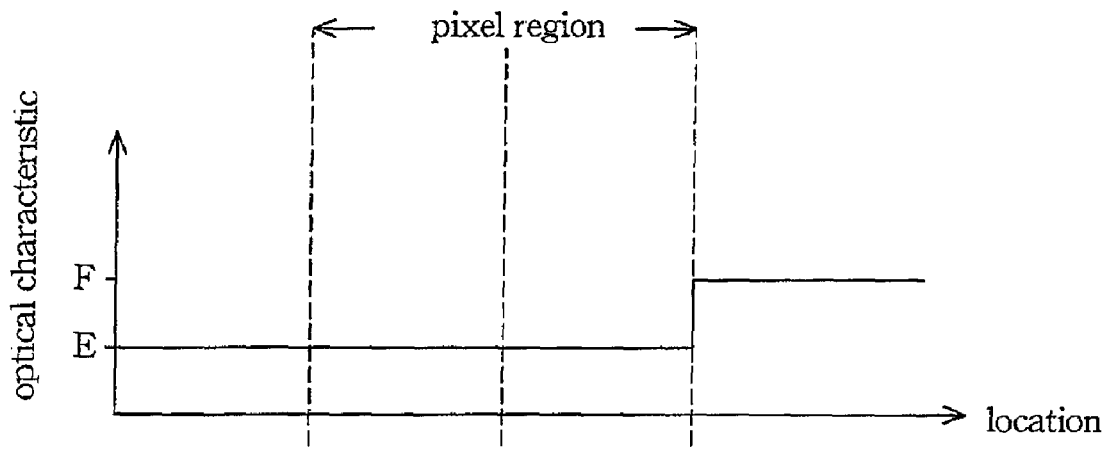
FIG. 5C to FIG. 5E illustrate the optical characteristic change schematic diagram of a pixel region of a liquid crystal display in accordance with the third embodiment of the present invention.
Figure 5D:
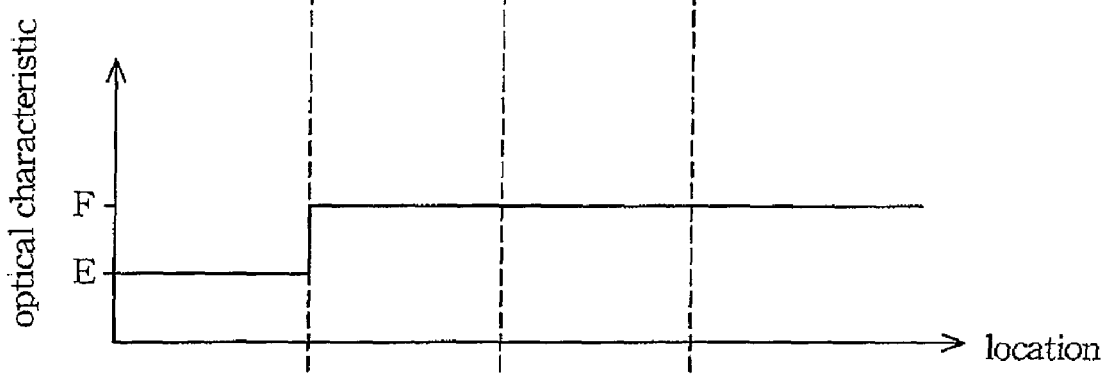
Figure 5E:
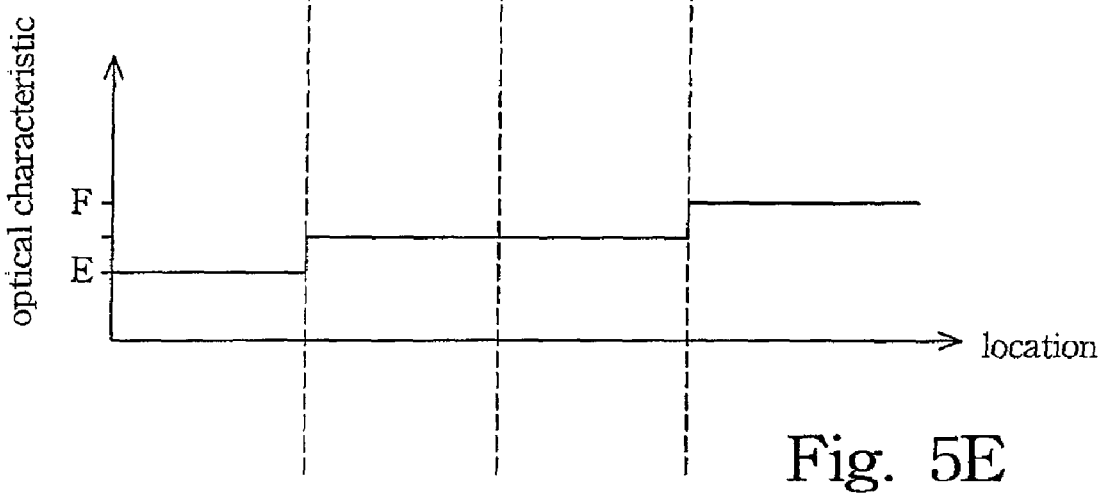

The two storage capacitors in a pixel region can determine the optical characteristic of this pixel region together. FIGS. 5C to 5E illustrate the optical characteristic change schematic diagram of a pixel region of a liquid crystal display in accordance with the third embodiment of the present invention. Reference is also made to FIG. 5A; the dotted line in the FIG. 5A indicates the linking region of two masks of photolithography process rounds.

According to this embodiment, the switching transistor 516 is arranged in the first region and is formed by the first photolithography process round. The switching transistor 518 is arranged in the second region and is formed by the second photolithography process round. When the first photolithography process round is finished, the process parameters of the switching transistor 516 can be determined by the first photolithography process round. When the second photolithography process round is finished, the process parameters of the switching transistor 518 can be determined by the second photolithography process round. The optical characteristic in the linking region can be determined by the two storage capacitors.

On the other hand, if the process parameter of the first photolithography process round presents an "E" optical characteristic and the process parameter of the second photolithography process round presents an "F" optical characteristic, the whole pixel region presents an "E" optical characteristic when the two storage capacitors 516 and 518 are formed by the first photolithography process round as shown in the FIG. 5C. Similarly, the whole pixel region presents an "F" optical characteristic when the two storage capacitors 516 and 518 are formed by the second photolithography process round, as shown in the FIG. 5D.

FIG. 5E illustrates the optical characteristic diagram of the pixel region when the two storage capacitors 516 and 518 are formed by different photolithography process round. According to the third embodiment, the storage capacitor 516 is formed by the first photolithography process round and the storage capacitor 518 is formed by the second photolithography process round. Therefore, the optical characteristic of the whole pixel region is determined by the "E" optical characteristic and the "F" optical characteristic. The optical characteristic diagram is the combined diagram of the "E" optical characteristic and the "F" optical characteristic. In other words, the optical characteristic of the whole pixel region is the average value of the "E" optical characteristic and the "F" optical characteristic.

According to the third embodiment, two storage capacitors are formed in a pixel region by different photolithography process rounds. At this time, the linking region of two masks of photolithography process rounds is aligned to this region between the two storage capacitors. In other words, the storage capacitors located in the two sides of the linking region are formed by different photolithography process rounds. Therefore, the pixel region's optical characteristic is affected by the two storage capacitors and presents an average value of the optical characteristics of the two storage capacitors. Compared with FIGS. 5C to 5E, the optical characteristic presented by the pixel region of the third embodiment has a smoother change.

Fourth Embodiment

The fourth embodiment of the present invention forms several storage capacitors and several switching transistors in a pixel region. On the other hand, the linking region of two masks of photolithography process rounds is aligned to this region among the storage capacitors and switching transistors. Therefore, the storage capacitors and switching transistors respectively located in the two sides of the linking region are formed by different photolithography process rounds. The different photolithography process rounds can make the storage capacitors and switching transistors have different process parameters. Therefore, the optical characteristic of the linking region is determined by the storage capacitors and switching capacitors located in the two sides of the linking region. The optical characteristic difference in the linking region can be released by the process parameters compensation of the storage capacitors.

Figure 6A:
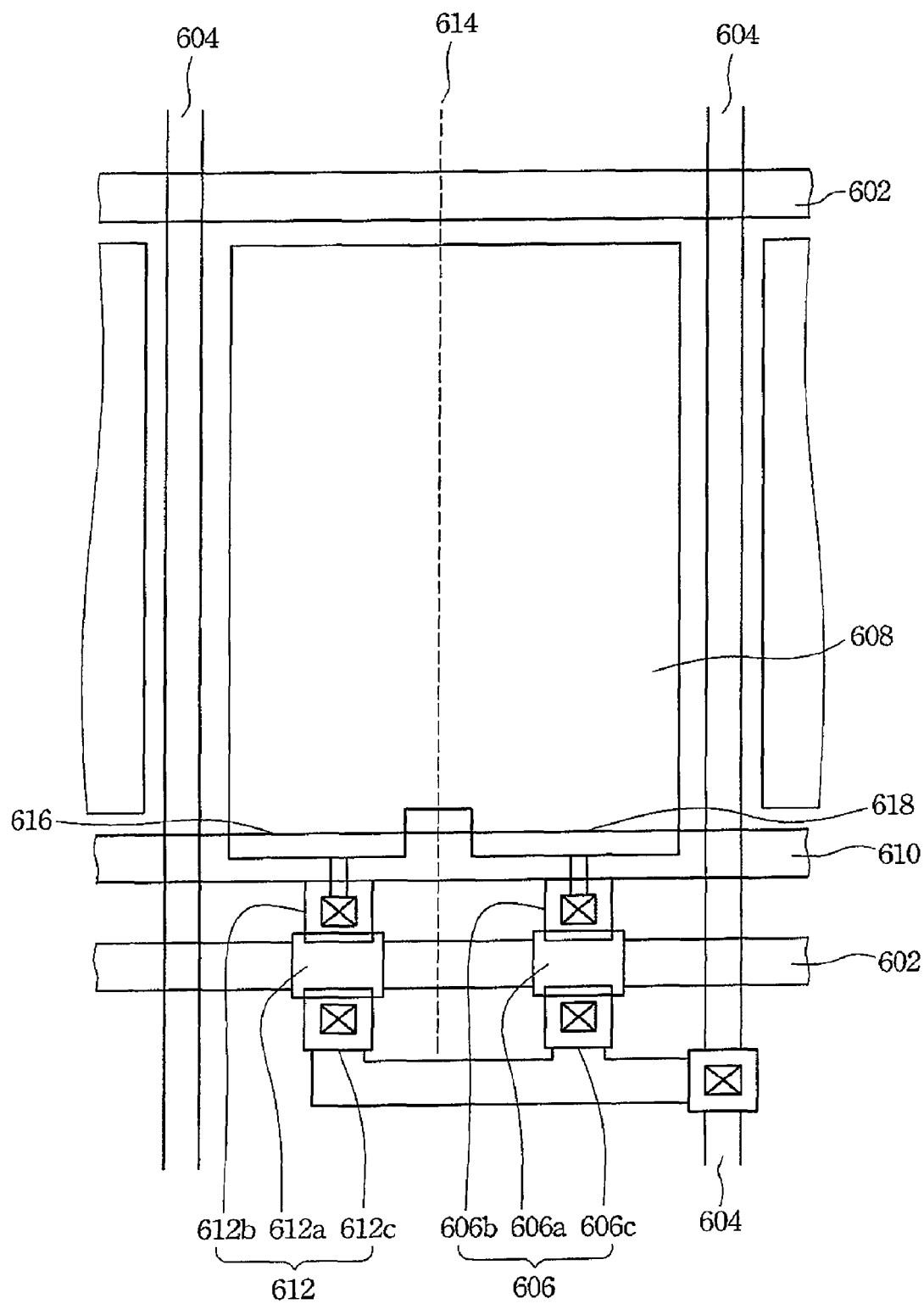
FIG. 6A illustrates a schematic top view diagram of a pixel region of a liquid crystal display in accordance with the fourth embodiment of the present invention.

FIG. 6A illustrates a schematic top view diagram of a pixel region of a liquid crystal display in accordance with the fourth embodiment of the present invention. A gate electrode 606a of the switching transistor 606 is connected with a scan line 602. A drain electrode 606b of the switching transistor 606 is connected with a pixel electrode 608. A source electrode 606c of the switching transistor 606 is connected with a video data line 604. On the other hand, a gate electrode 612a of the switching transistor 612 is connected with a scan line 602. A drain electrode 612b of the switching transistor 612 is connected with a pixel electrode 608. A source electrode 612c of the switching transistor 612 is connected with a video data line 604. A common electrode line 610 is used to provide the pixel electrode 608 as a common electrode in this embodiment. The switching transistor 606 and the switching transistor 612 formed on a glass substrate both have a structure of thin film transistor. The pixel electrode is formed by ITO or IZO thin film. Typically, storage capacitor $C_{ST}$ is the capacitor between the common electrode 610 and the pixel electrode 608. Therefore, according to the fourth embodiment, the overlapping region of the common electrode 610 and the pixel electrode 608 are divided into two parts. That is that the storage capacitor in a pixel region is composed of two storage capacitors 616 and 618.

When manufacturing the pixel region of the fourth embodiment, the linking region of two masks of photolithography process rounds is aligned to the two storage capacitors and switching transistors, as indicated by the arrow 614 in the figure. That is, that each switching transistor or each storage capacitor is formed by different photolithography process rounds in this embodiment. According to this embodiment, the two switching transistors 606 and 612 and the two storage capacitors 616 and 618 are divided into two groups to process different photolithography process rounds. For example, the switching transistor 612 and the storage capacitor 618 are arranged in the first region and are formed by the first photolithography process round. The switching transistor 606 and the storage capacitor 616 are arranged in the second region and are formed by the second photolithography process round. It is noted that the arrangement method of the storage capacitors can be changed according the requirement of the user.

The switching transistor 606 and the switching transistor 612 are formed by different photolithography process rounds. Therefore, some process parameters differences exist between the two switching transistors. The different process parameters may influence the diffusion capacitor Cgs between the source/drain electrode and the gate electrode of the two switching transistors. On the other hand, the storage capacitor 616 and the storage capacitor 618 are formed by the different photolithography process rounds. Therefore, some process parameters difference exists between the two storage capacitors. The different process parameters may influence storage capacitor $C_{ST}$. In other words, according to this embodiment, there are two storage capacitors and switching transistors with different process parameters in a pixel region. The two storage capacitors and the two switching transistors can influence the optical characteristic of this pixel region.

Figure 6B:
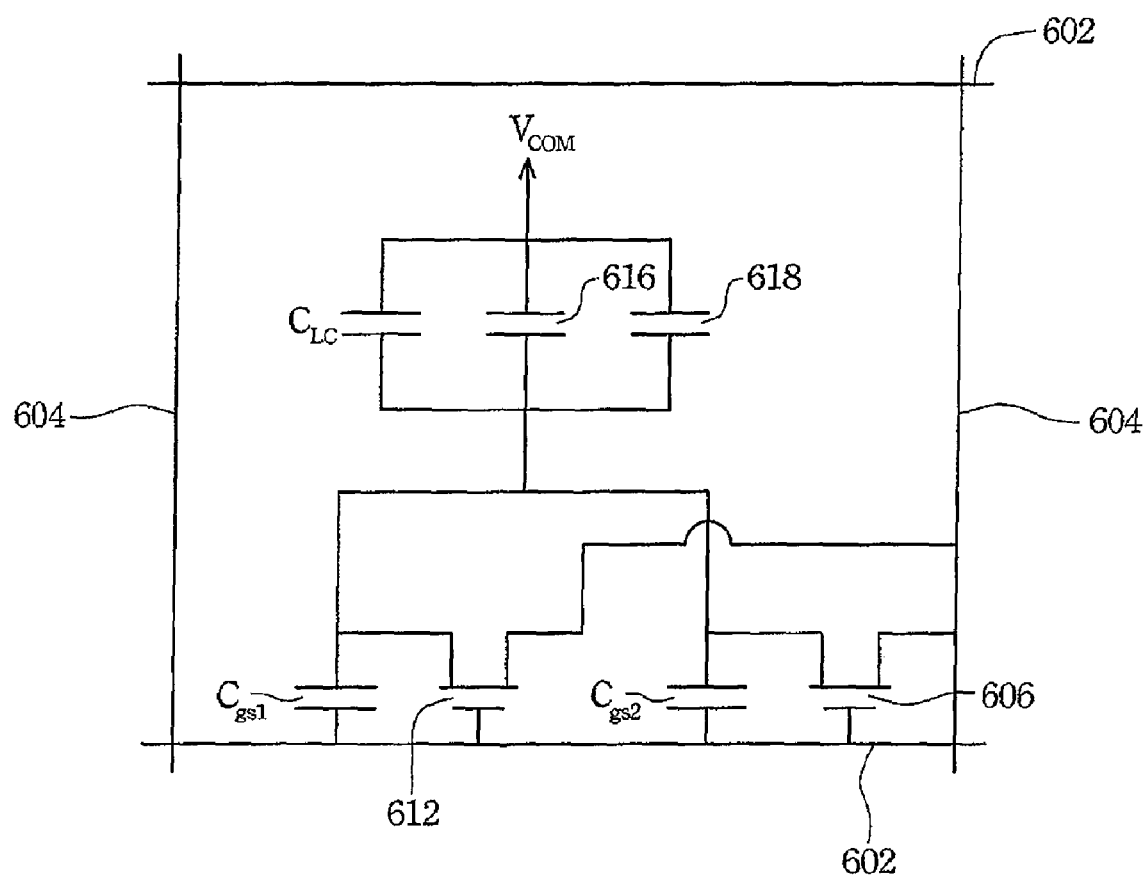
FIG. 6B illustrates a schematic diagram of an equivalent circuit of a pixel region of a liquid crystal display in accordance with the fourth embodiment of the present invention.

FIG. 6B illustrates a schematic diagram of an equivalent circuit of a pixel region of a liquid crystal display in accordance with the fourth embodiment of the present invention. Two switching transistors 606 and 612 in this pixel region are used to control the video signal transmission. A pixel capacitor $C_{LC}$ and two storage capacitors 616 and 618 are driven by the two switching transistors 606 and 612. The switching transistors 606 and 612 are formed in a transparent substrate (such as a glass). According to this embodiment, there are two switching transistors are formed by different photolithography process rounds in a pixel region. Therefore, the switching transistors 606 and 612 will have different diffusion capacitors between source/drain electrode and gate electrode. The switching transistor 612 has the diffusion capacitor $C_{gs1}$ and the switching transistor 606 has the diffusion capacitor $C_{gs2}$. On the other hand, the common electrode and the pixel electrode are formed by different photolithography process rounds. The storage capacitor is formed between the common electrode and the pixel electrode. Therefore, different photolithography process rounds may form different storage capacitors 616 and 618.

The source and drain electrodes of the switching transistor 612 are respectively connected with the pixel capacitor $C_{LC}$ and the two storage capacitors 616 and 618. Similarly, the source and drain electrodes of the switching transistor 606 are respectively connected with the pixel capacitor $C_{LC}$ and the two storage capacitors 616 and 618. When the video data line 604 is selected, the source/drain electrodes of the switching transistors 606 and 612 can receive data from the video data line 604.

In other words, when the scan signal selects the scan line 602, the switching transistors 606 and 612 are turned on. At this time, the video data transmitted by the video data line 604 can charge the pixel capacitor $C_{LC}$ and the storage capacitors 616 and 618 through the switching transistors 606 and 612. After the scan signal is removed, the charge is still stored in the pixel capacitor $C_{LC}$ until the scan signal selects this scan line 602 again. The stored charge in the pixel capacitor $C_{LC}$ can form an image in the display.

Figure 6C:
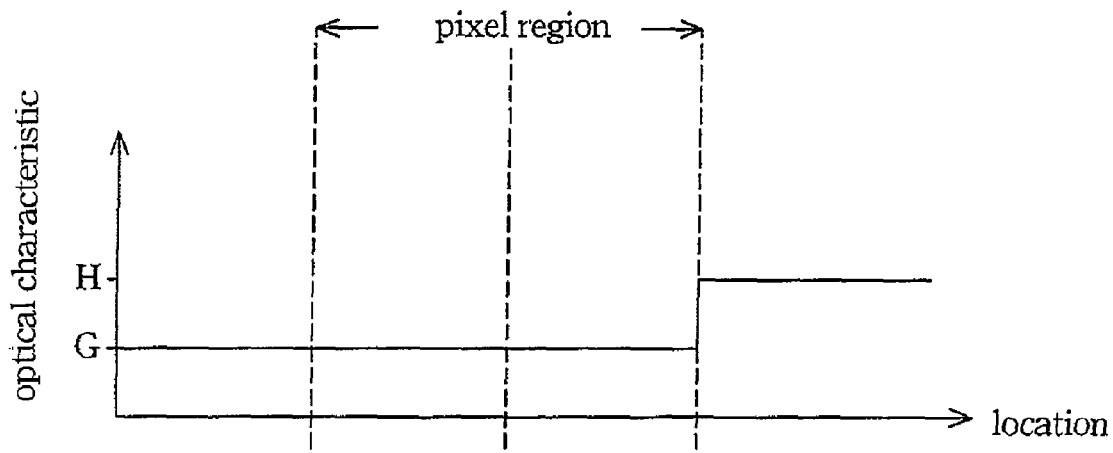
FIG. 6C to FIG. 6E illustrate the optical characteristic change schematic diagram of a pixel region of a liquid crystal display in accordance with the fourth embodiment of the present invention.
Figure 6D:
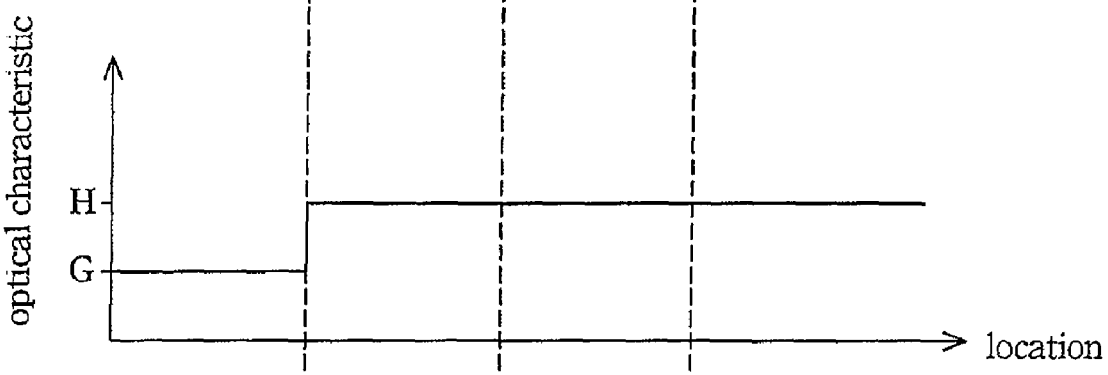
Figure 6E:
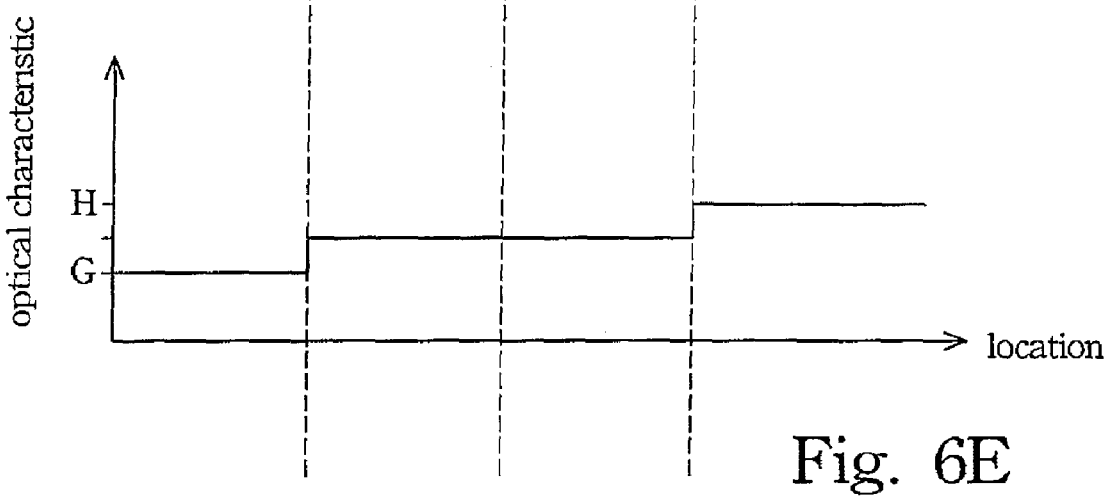

There are two storage capacitors and two switching transistors in a pixel region according to this embodiment. Therefore, the optical characteristic can be determined by these capacitors and transistors in this pixel region. FIGS. 6C to 6E illustrate the optical characteristic change schematic diagram of a pixel region of a liquid crystal display in accordance with the fourth embodiment of the present invention. Reference is also made to FIG. 6A; the dotted line in the FIG. 6A indicates the linking region of two masks of photolithography process rounds.

According to this embodiment, the switching transistor 612 and storage capacitor 616 are arranged in the first region and are formed by the first photolithography process round. The switching transistor 606 and storage capacitor 618 are arranged in the second region and are formed by the second photolithography process round. When the first photolithography process round is finished, the process parameters of the switching transistor 612 and storage capacitor 616 can be determined by the first photolithography process round. When the second photolithography process round is finished, the process parameters of the switching transistor 606 and storage capacitor 618 can be determined by the second photolithography process round. The optical characteristic in the linking region can be determined by the two storage capacitors.

On the other hand, if the process parameter of the first photolithography process round presents a "G" optical characteristic and the process parameter of the second photolithography process round presents a "H" optical characteristic, the whole pixel region presents a "G" optical characteristic when the two switching transistors 606 and 612 and the two storage capacitors 616 and 618 are formed by the first photolithography process round as shown in the FIG. 6C. Similarly, the whole pixel region presents a "H" optical characteristic when the two switching transistors 606 and 612 and the two storage capacitors 616 and 618 are formed by the second photolithography process round, as shown in the FIG. 6D.

FIG. 6E illustrates the optical characteristic diagram of the pixel region when the two switching transistors 606 and 612 and the two storage capacitors 616 and 618 are formed by different photolithography process round. According to the fourth embodiment, the switching transistor 612 and the storage capacitor 616 are formed by the first photolithography process round and the switching transistor 606 and the storage capacitor 618 are formed by the second photolithography process round. Therefore, the optical characteristic of the whole pixel region is determined by the "G" optical characteristic and the "H" optical characteristic. The optical characteristic diagram is the combined diagram of the "G" optical characteristic and the "H" optical characteristic. In other words, the optical characteristic of the whole pixel region is the average value of the "G" optical characteristic and the "H" optical characteristic.

According to the fourth embodiment, two switching transistors and two storage capacitors are formed in a pixel region by different photolithography process rounds. At this time, the linking region of two masks of photolithography process rounds is aligned to this region between the two switching transistors and two storage capacitors. In other words, each pair of the storage capacitor and the switching transistor is formed by a photolithography process round. Therefore, the pixel region's optical characteristic is affected by the two storage capacitors and the two switching transistors and presents an average value of the optical characteristics of the two storage capacitors and the two switching transistors. Compared with FIGS. 6C to 6E, the optical characteristic presented by the pixel region of the fourth embodiment has a smoother change.

Fifth Embodiment

The fifth embodiment is about an in plane switching (IPS) mode liquid crystal display. In general, the voltage direction applied to the liquid crystal molecule is parallel to the glass substrate in an IPS mode LCD. Therefore, the electrodes in the IPS mode LCD must be located in one glass substrate. Additionally, the electrodes are arranged like a comb in one glass substrate.

Figure 7:
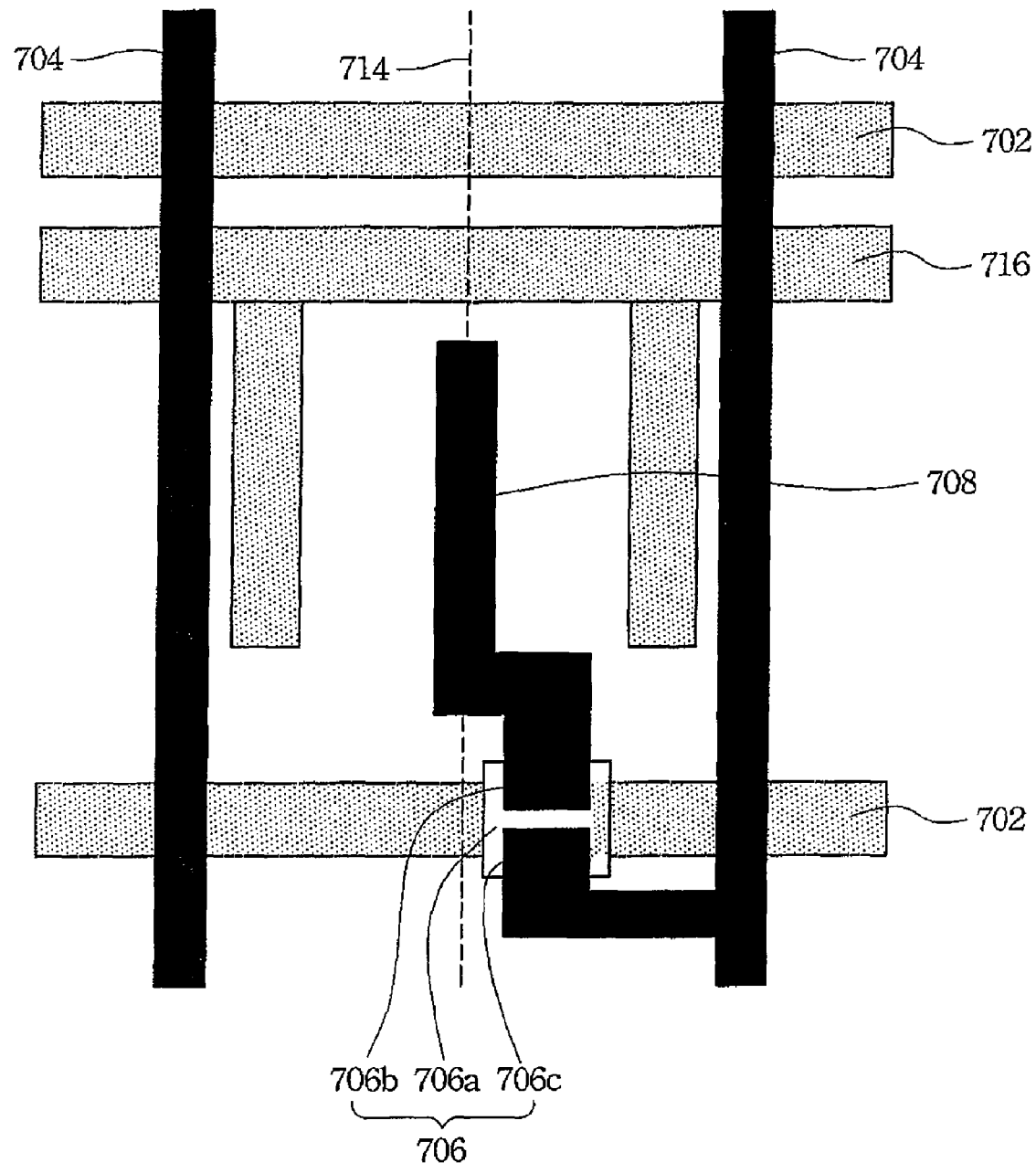
FIG. 7 illustrates a schematic diagram of an in plane switching (IPS) mode liquid crystal display.

FIG. 7 illustrates a schematic diagram of an in plane switching (IPS) mode liquid crystal display. A gate electrode 706a of the switching transistor 706 is connected with a scan line 702. A drain electrode 706b of the switching transistor 706 is connected with a pixel electrode 708. A source electrode 706c of the switching transistor 706 is connected with a video data line 704. A combined electrode 716 and a pixel electrode 708 provide voltage to rotate the liquid crystal molecule.

In an IPS mode LCD, the rotation angle of the liquid crystal molecule will be changed if the distance between the combined electrode 716 and the pixel electrode 708 is changed. However, according to the typical exposure method, the linking region of the masks of different photolithography process rounds is aligned to the linking region of adjacent pixel region. Therefore, the process parameters difference will make a difference of the distance between the combined electrode 716 and the pixel electrode 708 in the adjacent pixel region. The different distance presents different optical characteristic in the adjacent pixel region.

According to the exposure of the present invention, the linking region 714 of the masks of different photolithography process rounds is aligned to the region of the pixel electrode 708. This exposure method of the present invention makes that there are two kinds of process parameters in a pixel region. In other words, the optical characteristic of the pixel region is influenced by the two kinds of process parameters.

Sixth Embodiment

The sixth embodiment is also about an in plane switching (IPS) mode liquid crystal display.

Figure 8:
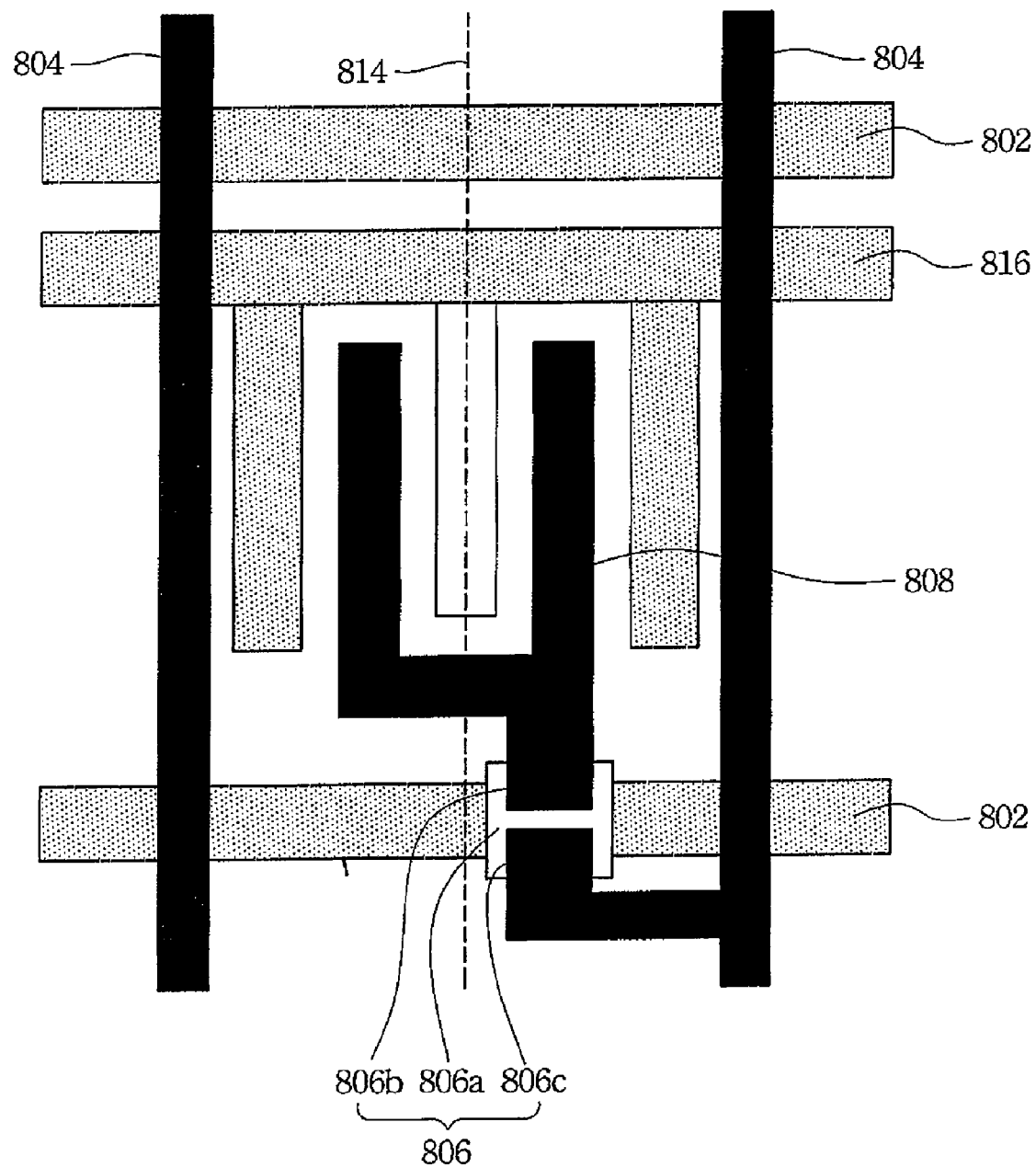
FIG. 8 illustrates a schematic diagram of another type in plane switching (IPS) mode liquid crystal display.

FIG. 8 illustrates a schematic diagram of an in plane switching (IPS) mode liquid crystal display. A gate electrode 806a of the switching transistor 806 is connected with a scan line 802. A drain electrode 806b of the switching transistor 806 is connected with a pixel electrode 808. A source electrode 806c of the switching transistor 806 is connected with a video data line 804. A combined electrode 816 and a pixel electrode 808 provide voltage to rotate the liquid crystal molecule.

In an IPS mode LCD, the rotation angle of the liquid crystal molecule will be changed if the distance between the combined electrode 816 and the pixel electrode 808 is changed. However, according to the typical exposure method, the linking region of the two masks of different photolithography process rounds is aligned to the linking region of adjacent pixel region. Therefore, the process parameters differences will make a difference in the distance between the combined electrode 816 and the pixel electrode 808 in the adjacent pixel region. The different distances presents different optical characteristics in the adjacent pixel region.

According to the exposure of the present invention, the linking region 814 of the masks of different photolithography process rounds is aligned to the region of the pixel electrode 808 in a pixel region. According to the exposure method of the present invention, the pixel electrode is formed by two photolithography process rounds in a pixel region. Therefore, there are two kinds of process parameters in a pixel region. In other words, the optical characteristic of the pixel region is influenced by the two kinds of process parameters. The optical characteristic presented by the pixel region of the embodiment has a smoother change, that is, the average optical characteristic of the two kinds of process parameters.

Accordingly, several storage capacitors and several switching transistors are formed in a pixel region. On the other hand, the linking region of two masks of photolithography process rounds is aligned to this region among the storage capacitors and switching transistors. Therefore, the storage capacitors and switching transistors respectively located in the two sides of the linking region are formed by different photolithography process rounds. The different photolithography process rounds can make the storage capacitors and switching transistors have different process parameters. Therefore, the optical characteristic of the linking region is determined by the storage capacitors and switching capacitors located in the two sides of the linking region. The optical characteristic difference in the linking region can be released by the process parameters compensation of the storage capacitors.

The above six embodiments describes the application of the present invention. However, the application of the present invention is not limited by the above six embodiments. For example, the present invention can be applied to different pixel structures to release the optical characteristic difference by using different photolithography process rounds to form these devices about ΔV.

Typically, a pixel region only includes a switching transistor. Therefore, no matter where the linking region of the two masks of two photolithography process rounds is, the optical characteristic can only be determined by this switching transistor. Therefore, if two adjacent pixel regions are formed by different photolithography process rounds, the two adjacent pixel regions will present different optical characteristic according to the process parameters of the switching transistors. Therefore, according to the present invention, those devices that influence the optical characteristic in a pixel region, such as the switching transistor or the storage capacitor, will be divided into several parts. Different photolithography process rounds will be applied to each part. Therefore, same devices formed by different photolithography process rounds will exist in a pixel region. Therefore, the pixel region presents an average optical characteristic of these devices. In other words, the pixel regions located in the region that link two regions applied by different photolithography process rounds can present an average optical characteristic of their adjacent pixel regions. Therefore, this method and structure of the present invention can improve the abrupt image change situation by building a buffer region in this pixel region.

The present invention provides different pixel structures to resolve the typical problem of ΔV value difference in a panel. This ΔV value difference is because different photolithography process rounds are respectively applied to different regions in a pixel region. The different photolithography process rounds generate different process parameters. The different process parameters cause different optical characteristic to generate an abrupt image change in a panel. Therefore, the present invention provides a pixel structure and exposure method to release the optical characteristic change in the region for linking two regions through different photolithography process round. According to the present invention, those devices that influence the optical characteristic in a pixel region, such as the switching transistor or the storage capacitor, will be divided into several parts. Different photolithography process rounds will be applied to each part. The linking region of two masks of photolithography process rounds is aligned to between these devices. Therefore, the photolithography process for forming each part is respectively performed. Therefore, the optical characteristic of the linking region is determined by the devices located in the two sides of the linking region. The optical characteristic difference in the linking region can be released by the process parameters compensation of the devices.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A method for forming a liquid crystal display having a plurality of scan lines and a plurality of video data lines crossing each other to define a plurality of pixel regions on a substrate, the method comprising:

forming a plurality of pixel electrodes in the pixel regions, wherein two adjacent scan lines and two adjacent video data lines define a pixel region, and each pixel region includes a pixel electrode, each pixel electrode is formed by a first sub-pixel electrode and a second sub-pixel electrode, wherein the second sub-pixel electrode is adjacent and directly connected to the first sub-pixel electrode without through other element to form the pixel electrode;

forming a plurality of switching devices in the pixel regions respectively, wherein each of the switching devices comprises a first switching transistor and a second switching transistor and has at least one gate electrode connected to a corresponding scan line, at least one source electrode connected to a corresponding pixel electrode and at least one drain electrode connected to a corresponding video data line; and forming a plurality of storage capacitors in the pixel regions respectively, each of the pixel regions includes at least a first storage capacitor and a second storage capacitor coupling to video data lines through corresponding switching device, and the first storage capacitor corresponds to said first sub-pixel electrode and the second storage capacitor corresponds to said second sub-pixel electrode, wherein, in at least one of the pixel regions, the first storage capacitor and the second storage capacitor are formed by different process rounds to have different process parameters respectively.

2. The method of claim 1, wherein the process includes a photolithography process.

3. The method of claim 1, wherein the first switching transistor and the second switching transistor located in the at least one of the pixel regions are with different diffusion capacitors.

4. The method of claim 1, wherein the first switching transistor and the second switching transistor located in the at least one of the pixel regions are formed by different process rounds to have different process parameters respectively.

5. The method of claim 1, wherein the drain electrode of the first switching transistor and that of the second switching transistor are connected to the same one video data signal line.

6. The method of claim 1 wherein the electrodes of the storage capacitors are composed of a portion of the pixel electrode and the scan line.

7. The method of claim 1, wherein each of the pixel regions further comprises a common electrode.

8. The liquid crystal display of claim 7, wherein the electrodes of the first storage capacitor is composed of a portion of the first sub-pixel electrode and the common electrode, and the electrodes of the second storage capacitor is composed of a portion of the second sub-pixel electrode and the common electrode.

9. The liquid crystal display of claim 8, wherein the switching device comprises a first switching transistor and a second switching transistor.

10. The method of claim 9, wherein the first switching transistor and the second switching transistor located in the at least one of the pixel regions are formed by different process rounds to have different process parameters respectively.

11. A method for forming a liquid crystal display having a plurality of scan lines and a plurality of video data lines crossing each other to define a plurality of pixel regions on a substrate, the method comprising:
  forming a plurality of pixel electrodes in the pixel regions, wherein two adjacent scan lines and two adjacent video data lines define a pixel region, and each pixel region includes a pixel electrode formed by a first sub-pixel electrode and a second sub-pixel electrode wherein the second sub-pixel electrode is adjacent and directly connected to the first sub-pixel electrode without through other element to form the pixel electrode;
  forming a plurality of first switching transistors in the pixel regions respectively, wherein each of the first switching transistors is coupled to its corresponding first sub-pixel electrode;
  forming a plurality of second switching transistors in the pixel regions respectively, wherein each of the second switching transistors is coupled to its corresponding second sub-pixel electrode, and in at least one of the pixel regions, the first switching transistor and the second switching transistor are formed by different process rounds to have different process parameters respectively; and
  forming a plurality of storage capacitors through the formation of the pixel electrodes and the scan lines or a common electrode in the pixel regions respectively.

12. The method of claim 11, wherein the process includes a photolithography process.

13. The method of claim 11, wherein the first switching transistor and the second switching transistor located in the at least one of the pixel regions are with different diffusion capacitor.

14. The method of claim 11, wherein the first sub-pixel electrode and the second sub-pixel electrode located in the at least one of pixel regions are formed by different process rounds to have different process parameters respectively.

15. The method of claim 11, wherein each of the first transistors has a first gate electrode connected to a corresponding scan line, a first source electrode connected to a corresponding first sub-pixel electrode and a first drain electrode connected to a corresponding video data line.

16. The method of claim 11, wherein each of the second switching transistors has a second gate electrode connected to a corresponding scan line, a second source electrode connected to a corresponding second sub-pixel electrode and a second drain electrode connected to a corresponding video data line.

17. The method of claim 11, further comprising forming a plurality of combined electrodes, wherein the combined electrodes and the pixel electrodes provide voltage to rotate liquid crystal molecules.

* * * * *